United States Patent
Zhang et al.

(10) Patent No.: US 12,533,595 B2
(45) Date of Patent: Jan. 27, 2026

(54) VOICE PLAYING METHOD, VOICE TRANSMISSION METHOD, APPARATUSES, AND ELECTRONIC DEVICE

(71) Applicant: TENCENT TECHNOLOGY (SHENZHEN) COMPANY LIMITED, Guangdong (CN)

(72) Inventors: Jialu Zhang, Shenzhen (CN); Jun Zhang, Guangdong (CN); Yu Bi, Shenzhen (CN); Fan Yang, Shenzhen (CN); Ling Qin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 299 days.

(21) Appl. No.: 18/327,490

(22) Filed: Jun. 1, 2023

(65) Prior Publication Data

US 2023/0302370 A1   Sep. 28, 2023

Related U.S. Application Data

(63) Continuation of application No. PCT/CN2022/105399, filed on Jul. 13, 2022.

(30) Foreign Application Priority Data

Aug. 12, 2021   (CN) .......................... 202110927050.4

(51) Int. Cl.
    *A63F 13/86*   (2014.01)
    *A63F 13/87*   (2014.01)
(52) U.S. Cl.
    CPC .............. *A63F 13/86* (2014.09); *A63F 13/87* (2014.09)

(58) Field of Classification Search
    None
    See application file for complete search history.

(56) References Cited

U.S. PATENT DOCUMENTS

| | | | | |
|---|---|---|---|---|
| 10,639,548 | B1* | 5/2020 | Bansi | ...................... A63F 13/79 |
| 2015/0121437 | A1* | 4/2015 | Tan | .................... H04N 21/2187 |
| | | | | 725/93 |

(Continued)

FOREIGN PATENT DOCUMENTS

| CN | 104645614 A | 5/2015 |
|---|---|---|
| CN | 114082199 A | 2/2022 |
| JP | 2001-306719 A | 11/2001 |

OTHER PUBLICATIONS

Baidu, "How does the wilderness action close the watchful voice?", May 3, 2019, https://jingyan.baidu.com/article/cbf0e5006f7fdc2eab289345.html (3 pages total).

(Continued)

*Primary Examiner* — Jason T Yen
(74) *Attorney, Agent, or Firm* — Sughrue Mion, PLLC

(57) ABSTRACT

A voice playing method, a voice transmission method, a voice playing apparatus, and a voice transmission apparatus are provided. The voice playing method includes displaying a game image of a game and a voice playing object on a first user equipment to which a first account in an online game system logs on; controlling, based on the first account selecting to spectate in the game, the voice playing object to be in an on state, in which the first user equipment is enabled to play a second voice generated in association with a second account participating in the game in the online game system; and playing the second voice in the first user equipment, based on the voice playing object being in the on state and based on setting information of the second account indicating that the first account is allowed to listen to the second voice.

17 Claims, 11 Drawing Sheets

(56) References Cited

U.S. PATENT DOCUMENTS

| | | | | |
|---|---|---|---|---|
| 2019/0099678 A1* | 4/2019 | Khan | ...................... | A63F 13/44 |
| 2019/0314728 A1* | 10/2019 | Sullivan | ................ | A63F 13/355 |
| 2022/0053219 A1* | 2/2022 | Bathory | ........... | H04N 21/47815 |
| 2022/0134225 A1* | 5/2022 | Omote | .................... | G06T 13/80 |
| | | | | 463/31 |

OTHER PUBLICATIONS

Baidu, "How Peak Jack screens a certain designated teammate's voice-Balance experience, How Peak Jack screens a certain designated teammate's voice", Jul. 13, 2019, https://jingyan.baidu.com/article/0f5fb099b6de972d8334ead2.html (2 pages total).

Baidu, "How to watch friends with wilderness", Mar. 22, 2018, https://jingyan.baidu.com/article/49ad8bce993a985834d8fa30.html (3 pages total).

Communication issued Mar. 25, 2025 in Chinese Application No. 202110927050.4.

Xiaoyugan Youxi, "The Playerunknown's Battlegrounds Spectator Function has Ushered in an Upgrade, You can Send Gifts, Make Voice Calls, and Non-friends can Watch it!" Baidu, Dec. 30, 2020, 8pgs., http://baijiahao.baidu.com/s?id=1687479163S256399.

Tencent Video Official, "Peace Elite: Welcome to the Upgrade of the Spectator Function, which can not only Send Voice but also Give Gifts!", Jan. 20, 2021, 7 pgs., Tencent Video http://m.v.qq.com/z/msite/play-short/index.hlml?cid=&vid=c3218eiejxg&qqVersitm=0.

International Search Report for PCT/CN2022/105399 dated Oct. 9, 2022 (PCT/ISA/210).

Written Opinion of the International Search Report for PCT/CN2022/105399 dated, Oct. 9, 2022 (PCT/ISA/237).

Communication issued Sep. 9, 2024 in Japanese Application No. 2023-571702.

YouTube, "Friend watching function; found. (PC version)", < URL: https://www.youtube.com/watch?v=t10OowIQHWI >, 2018, retrieved Aug. 30, 2024, 3 pages.

"A method of making an incomprehensible way, a cause of a failure to learn, a Otome game life", 2020, <URL:https://app [search], and an Internet [search]—kingdoms.com/kouyakoudou-kansen/>, retrieved Aug. 17, 2024, 23 pages.

YouTube, "In a case where the opponent is engaged in a wrongful talk", <URL: https://www.youtube.com/watch?v=aQ2aJ3wQVPU >, retrieved Aug. 30, 2024, 2 pages.

"Methods of making a viewing in an urban action, a method of watching the same, a Hitman", 2018, URL <batt-619.com/25333.html>, retrieved on Aug. 30, 2024, 11 pages.

* cited by examiner

VOICE PLAYING METHOD, VOICE TRANSMISSION METHOD, APPARATUSES, AND ELECTRONIC DEVICE

CROSS-REFERENCE TO RELATED APPLICATIONS

This application is a bypass continuation application of International Patent Application No. PCT/CN2022/105399, filed on Jul. 13, 2022, which is based on and claims priority to Chinese Patent Application No. 202110927050.4, filed with the China National Intellectual Property Administration on Aug. 12, 2021, the disclosures of each of which are incorporated herein by reference in their entireties.

FIELD

The present disclosure relates to the field of computers, and in particular, to a voice playing method, a voice transmission method, apparatuses, and an electronic device.

DESCRIPTION OF RELATED ART

In recent years, online games have developed increasingly rapidly. Typically, an online gaming platform allows only a limited number of users to participate in a game as two opposing sides.

SUMMARY

In accordance with certain embodiments of the present disclosure, a voice playing method applied to an electronic device is provided. The method includes displaying a game image of a game and a voice playing object on a first user equipment to which a first account in an online game system logs on; controlling, based on the first account selecting to spectate in the game, the voice playing object to be in an on state, in which the first user equipment is enabled to play a second voice generated in association with a second account participating in the game in the online game system; and playing the second voice in the first user equipment, based on the voice playing object being in the on state and based on setting information of the second account indicating that the first account is allowed to listen to the second voice of the second account.

In accordance with other embodiments of the present disclosure, a voice transmission method applied to an electronic device is provided. The method includes displaying a game image of a game and a voice acquisition object on a second user equipment to which a second account in an online game system logs on; controlling, based on the second account participating in a game, the voice acquisition object to be in an on state, in which, based on setting information of a first account spectating in the game in the online game system indicating that listening to a voice of the second account is allowed, the second user equipment is enabled to transmit a second voice generated in association with the second account to first user equipment to which the first account logs on for playing; and transmitting the second voice to the first user equipment, based on the voice acquisition object being in the on state and based on the setting information of the first account indicating that listening to the second voice is allowed.

In accordance with still other embodiments of the present disclosure, a voice playing apparatus is provided. The apparatus includes at least one memory configured to store program code; and at least one processor configured to read the program code and operate as instructed by the program code. The program code includes display code, configured to cause the at least one processor to display a game image of a game and a voice playing object on a first user equipment to which a first account in an online game system logs on; control code, configured to cause the at least one processor to control, based on the first account in an online game system selecting to spectate in the game, the voice playing object to be in an on state, in which the first user equipment is enabled to play a second voice generated in association with a second account participating in the game in the online game system; and playing code, configured to cause the at least one processor to play the second voice in the first user equipment, based on the voice playing object being in the on state and based on setting information of the second account indicating that the first account is allowed to listen to the second voice.

BRIEF DESCRIPTION OF THE DRAWINGS

The drawings described herein are used to provide a further understanding of the present disclosure, and constitute a part of the disclosure. Schematic embodiments of the present disclosure and descriptions thereof are used to explain the present disclosure and not intended to form improper limitations on the present disclosure. In the drawings.

DETAILED DESCRIPTION

Figure 1:
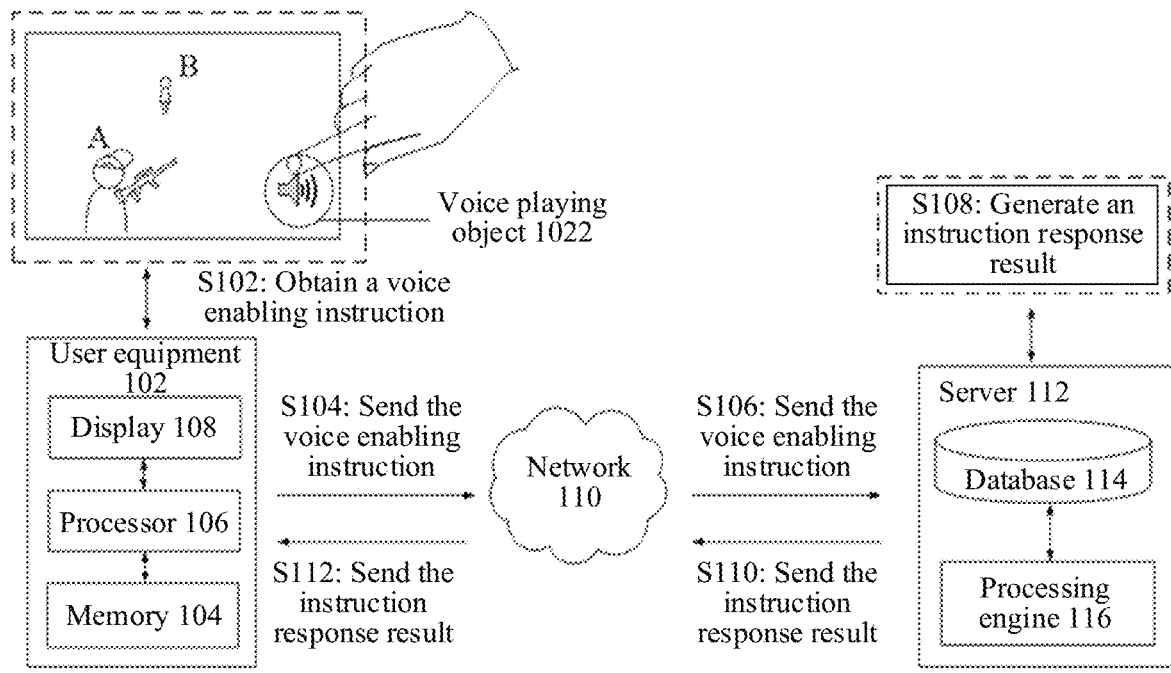
FIG. 1 is a schematic diagram of an application environment of a voice playing method according to an embodiment of the present disclosure.

To make the solutions of the present disclosure understood better by a person skilled in the art, the technical solutions in embodiments of the present disclosure will be described clearly and completely below in combination with the drawings. It will be understood that the described embodiments are not all but merely some of the embodiments of the present disclosure. All other embodiments obtained by a person of ordinary skill in the art based on the embodiments disclosed herein without creative work shall fall within the protection scope of the present disclosure.

Terms such as "first", "second", and the like in the specification, the claims, and the foregoing accompanying drawings of the present disclosure are used to distinguish between similar objects rather than indicate a specific order. It is to be understood that data used like this may be interchanged as appropriate such that the embodiments disclosed herein may be implemented in sequences in addition to those illustrated or described herein. In addition, terms "include" and "have" and any transformations thereof are intended to cover nonexclusive inclusions. For example, a process, a method, a system, a product, or a device including a series of operations or units is not limited to the operations or units that are clearly listed but may include other operations or units that are not clearly listed or intrinsic to the process, the method, the product, or the device.

For ease of understanding various embodiments of the present disclosure, the following explains some terms or nouns involved in the present disclosure.

Multiplayer online battle arena (MOBA): a game in which, in combat, equipment usually needs to be purchased, and players are often divided into two teams that compete with each other in a decentralized game map.

In-game: a state in which, in a MOBA game, an in-game player operates a game character (referred to as a hero in some games) as an actual participant.

Observation: also termed "spectating"; a state in which, in the MOBA game, a player watches in a combat as a non-opponent, and cannot operate a game character.

An embodiment of the present disclosure provides a voice playing method. The method may be applied but is not limited to an environment shown in FIG. 1. The environment may include but is not limited to user equipment 102, a network 110, and a server 112. The user equipment 102 may include but is not limited to a display 108, a processor 106, and a memory 104. The server 112 may include but is not limited to a database 114 and a processing engine 116.

In an embodiment, the method may include the following operations.

Operation S102: The user equipment 102 recognizes a selection of a voice playing object 1022 within a game picture or game image of a game displayed in the display 108, and further obtains a voice enabling instruction, the voice enabling instruction being used for enabling a voice channel between a watcher who watches the game and a participant (watched one) who participates in the game.

Operations S104 and S106: The user equipment 102 sends the voice enabling instruction to the server 112 through the network 110.

Operation S108: The server 112 processes the voice enabling instruction through a processing engine 116, thereby generating an instruction response result.

Operations S110 and S112: The server 112 sends the instruction response result to the user equipment 102 through the network 110. A processor 106 in the user equipment 102 determines, according to an indication of the instruction response result, whether the voice channel is enabled, displays the instruction response result in the display 108 (if the voice channel is enabled, the voice playing object 1022 is turned on, or if the voice channel is disabled, the voice playing object 1022 is grayed), and stores the instruction response result in the memory 104.

In addition to the example shown in FIG. 1, the operations may be independently completed by the user equipment 102. That is, the user equipment 102 performs the operations of processing the voice enabling instruction, and the like. Therefore, processing pressure of the server is reduced. The user equipment 102 includes but is not limited to a handheld device (for example, a mobile phone), a notebook computer, a desktop computer, an in-vehicle device, and the like. A specific implementation of the user equipment 102 is not limited in the present disclosure.

In this and other various embodiments of the present disclosure, when the first account spectates in the game in which the second account is participating, the second account does not need to quit the game in which the second account currently participates and then send a voice message to the first account in a chat channel in a game lobby, like in the related art, and instead, the voice generated in real time by the second account in the game may be obtained and played through the voice playing object. In this way, a capability of the online game system in providing an online game service is enhanced, and performance of the online game system is improved.

Further, in various embodiments of the present disclosure, when the first account spectates in the game in which the second account is participating, bidirectional voice interaction is implemented through the voice playing object or through the voice playing object and the voice acquisition object. That is, when the first account spectates in the game in which the second account is participating, the first account can hear the voice generated in real time by the second account in the game, and the second account can hear the voice generated in real time by the first account during spectating in the game. Therefore, the capability of the online game system in providing the online game service is enhanced, and the performance of the online game system is improved.

Figure 2:
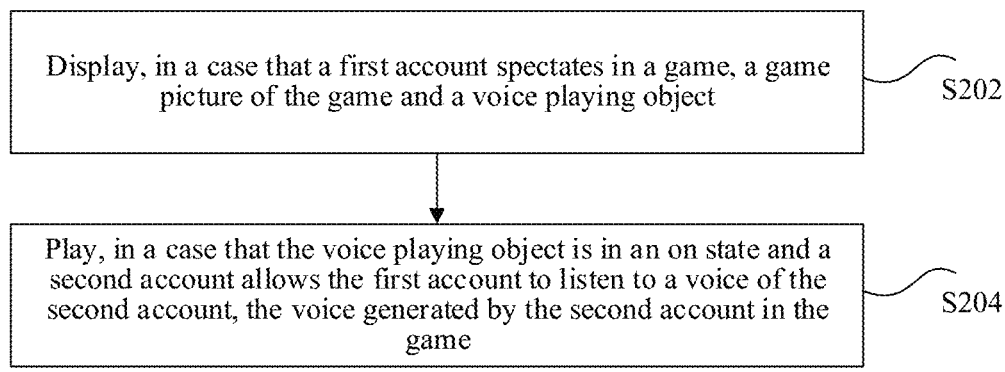
FIG. 2 is a schematic flowchart of a voice playing method according to an embodiment of the present disclosure.

In some embodiments, as shown in FIG. 2, the voice playing method includes the following operations. The method may be performed by an electronic device, for example, user equipment or a server. When the method is performed by the user equipment, some operations are implicitly implemented under assistance of the server. For example, the user equipment obtains, from the server, and plays voice data to be played. When the method is performed by the server, some operations are implicitly implemented under assistance of the user equipment. For example, the server provides voice data to be played for the user equipment, for the user equipment to play.

S202: Display, in a case that a first account in an online game system selects to spectate in a game, a game picture (or image) of the game and a voice playing object in user equipment to which the first account logs on, the voice playing object being used in an on state for allowing the user equipment to play a voice generated by a second account participating in the game.

S204: Play, in the user equipment to which the first account logs on in a case that the voice playing object is in the on state and setting information of the second account in the online game system indicates that the first account is allowed to listen to the voice of the second account, the voice generated by the second account in the game.

In some embodiments, setting information of an account in the online game system may be preset information of the account in user setting information of the online game system.

In some embodiments, setting information of an account in the online game system may be information of the account set for a game.

In some embodiments, the setting information may be setting information set for all accounts in the online game system to indicate whether allow all users to listen to the voice of the account.

In some embodiments, the setting information may be setting information set for one or more specified users to indicate whether a specified account to listen to the voice of the account.

In some embodiments, the voice playing method may be applied but is not limited to a MOBA game scene. For example, in a running process of a MOBA game, both opposing sides operate game characters in the game as actual participants, and another user who does not belong to both opposing sides may watch the game as a non-opponent (that is, a spectator or a watcher), and cannot operate a game character. By the voice playing method, one or more channels supporting voice transmission are provided for a watcher (that is, a spectator) who watches in the game as a non-opponent and a watched one (that is, a game player) who is an actual participant. Therefore, the watcher may receive a voice generated by the game player in the current MOBA game. Likewise, the game player may but is not limited to receive a voice generated by the watcher before/during/after running of the current MOBA game.

The first account is an observer account (also referred to as a spectator account) observing in the game, and the second account is an observed account (also referred to as a player account) participating in the game. If the first account and the second account are in association in a game platform, for example, they are friends or followers of each other, a user of the first account may select to perform voice transmission with the second account involved in the game by chatting privately (that is, through a mechanism provided by the game platform for users to exchange chat messages). However, in the related art, the first account needs to temporarily quit a spectator interface of the game and separately call a voice transmission channel or interface for chatting privately with the friend.

In this embodiment, in the case that the voice playing object is in the on state and the setting information of the second account in the online game system indicates that the first account is allowed to listen to the voice of the second account, the first account may play the voice generated by the second account in the game without quitting a spectator picture (or image) of the game. This eliminates a complex operation, enhances a capability of the online game system in providing an online game service, and improves performance of the online game system.

In this embodiment, the voice playing object may include but is not limited to a voice playing identifier displayed on the game picture, for example, a virtual microphone identifier, a virtual receiver identifier, a virtual ear identifier, or a virtual lip identifier. In addition, the voice playing object may be in but is not limited to a plurality of states, for example, the on state, an off state, a banned state, or a chilled state. When the voice playing object is in the off state, the electronic device may but is not limited to not play the voice generated by the second account in the game. When the voice playing object is in the off state, and an enabling operation triggered on the voice playing object is obtained, the electronic device may but is not limited to adjust the voice playing object to the on state. When the voice playing object is in the banned state, the electronic device may but is not limited to not play the voice generated by the second account in the game, and when an enabling operation triggered on the voice playing object is obtained, the electronic device may but is not limited to keep the voice playing object in the banned state; that is, the playing of the voice may remain disabled. When the voice playing object is in the chilled state, the electronic device may but is not limited to not play the voice generated by the second account in the game, and when an enabling operation triggered on the voice playing object is obtained, and duration of the chilled state does not reach preset duration, the electronic device may but is not limited to keep the voice playing object in the chilled state.

When the first account spectates in the game, the voice playing object for voice transmission is provided on the spectator interface, and a status of the voice playing object is determined to play the voice generated by the second account in the game. Therefore, the capability of the online game system in providing the online game service is enhanced, and the performance of the online game system is improved.

According to the voice playing method of this embodiment of the present disclosure, compared with a manner in the related art in which the spectator needs to quit the spectator interface of the game in which the spectator currently spectates and then plays the voice by using another chat mechanism, the solution of this embodiment of the present disclosure has the advantages that the spectator directly completes playing the voice in the spectator interface of the game without switching to another voice transmission mechanism, which reduces a complex interface adjustment operation of the spectator, and the game player also does not need to switch a current game interface to an interface of the another voice transmission mechanism. Therefore, the capability of the online game system in providing the online game service is enhanced, and the performance of the online game system is improved.

Figure 3:
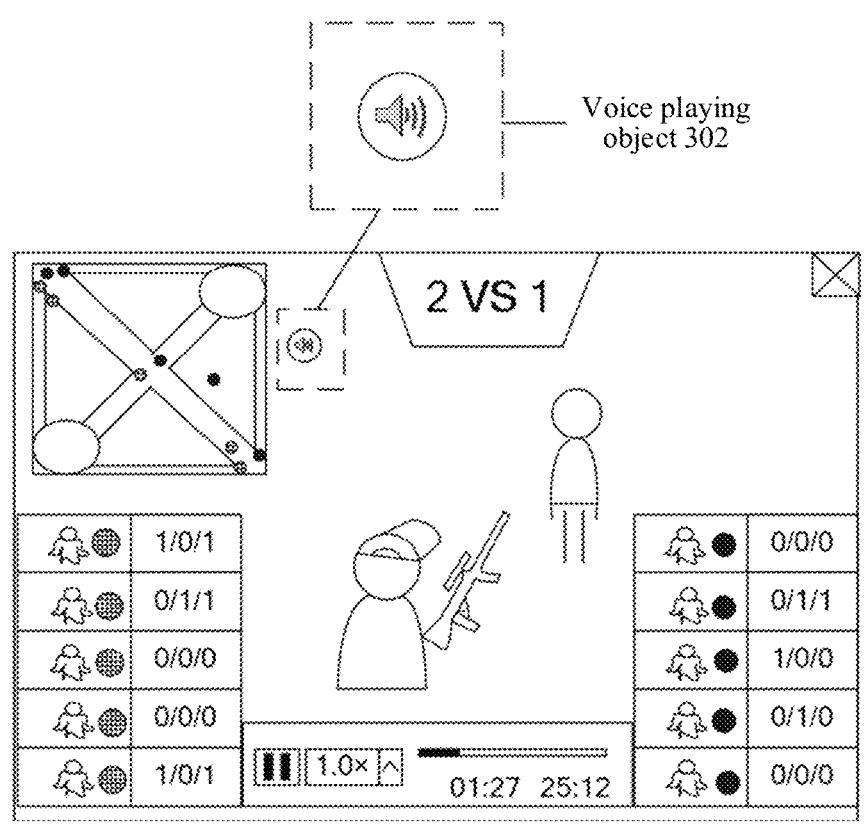
FIG. 3 is a diagram illustrating performance of a voice playing method according to an embodiment of the present disclosure.

For example, as shown in FIG. 3, the game picture of the game in which the first account (the spectator) spectates and a voice playing object 302 are displayed in the user equipment to which the first account logs on (which may be termed "first user equipment"), the voice playing object 302 being used in the on state for allowing playing of the voice generated by the second account (the game player) participating in the game. The voice generated by the second account in the game (which may be termed a "second voice") is played in the user equipment to which the first account logs on in a case that the voice playing object 302 is in the on state and the setting information of the second account in the online game system indicates that the first account is allowed to listen to the voice of the second account.

In addition, in this embodiment, a total of ten game accounts of both opposing sides are displayed in the game picture of the game in which the first account (the spectator) spectates, and the ten game accounts are divided into two factions, each of which is allocated with five game accounts. Based on this, the second account (the game player) may be but is not limited to one of the ten game accounts, or may be but is not limited to all the game accounts in one of the two factions, or may be but is not limited to all the ten game accounts.

In this embodiment, in the game picture of the game in which the first account (the spectator) spectates, the first account (the spectator) may adjust game pictures corresponding to different time points in the game. In a playing process, a playing speed may but is not limited to be adjusted by the first account (the spectator), and further, the played voice generated by the second account in the game may but is not limited to correspond to an adjusted game picture. For example, the currently displayed game picture is a picture corresponding to time "01:27" in a game progress, and further, the played voice generated by the second account in the game may but is not limited to be a voice corresponding to the time "01:27" in the game progress.

In this embodiment, the played voice generated by the second account in the game may alternatively but is not limited to be understood as a real-time voice. For example, the currently displayed game picture is a picture corresponding to time "01:27" in a game progress, but the played voice generated by the second account in the game may but is not limited to be a voice corresponding to time "25:12", that is, a real-time voice.

According to an embodiment of the disclosure, the game picture of the game and the voice playing object are displayed in the user equipment to which the first account logs on in the case that the first account selects to spectate in the game, the voice playing object being used in the on state for allowing the user equipment to which the first account logs on to play the voice generated by the second account participating in the game. The voice generated by the second account in the game is played in the case that the voice playing object is in the on state and the setting information of the second account in the online game system indicates that the first account is allowed to listen to the voice of the second account. Therefore, the capability of the online game system in providing the online game service is enhanced, and the performance of the online game system is improved.

In some embodiments, the method may further include the following operations:
  Display, in the user equipment to which the first account logs on at the beginning of displaying of the game picture of the game in which the first account spectates, the voice playing object that defaults to the on state; or
  Set the voice playing object in the on state in response to a first target operation performed on the voice playing object in an off state.

In this embodiment, at the beginning of displaying of the game picture of the game in which the first account spectates, a status of the voice playing object may but is not limited to default to a specific fixed state, for example, the on state or the off state.

In this embodiment, the status of the voice playing object may be adjusted in response to the first target operation performed on the voice playing object. For example, the voice playing object is set in the on state in response to the first target operation performed on the voice playing object in the off state.

Figure 4:
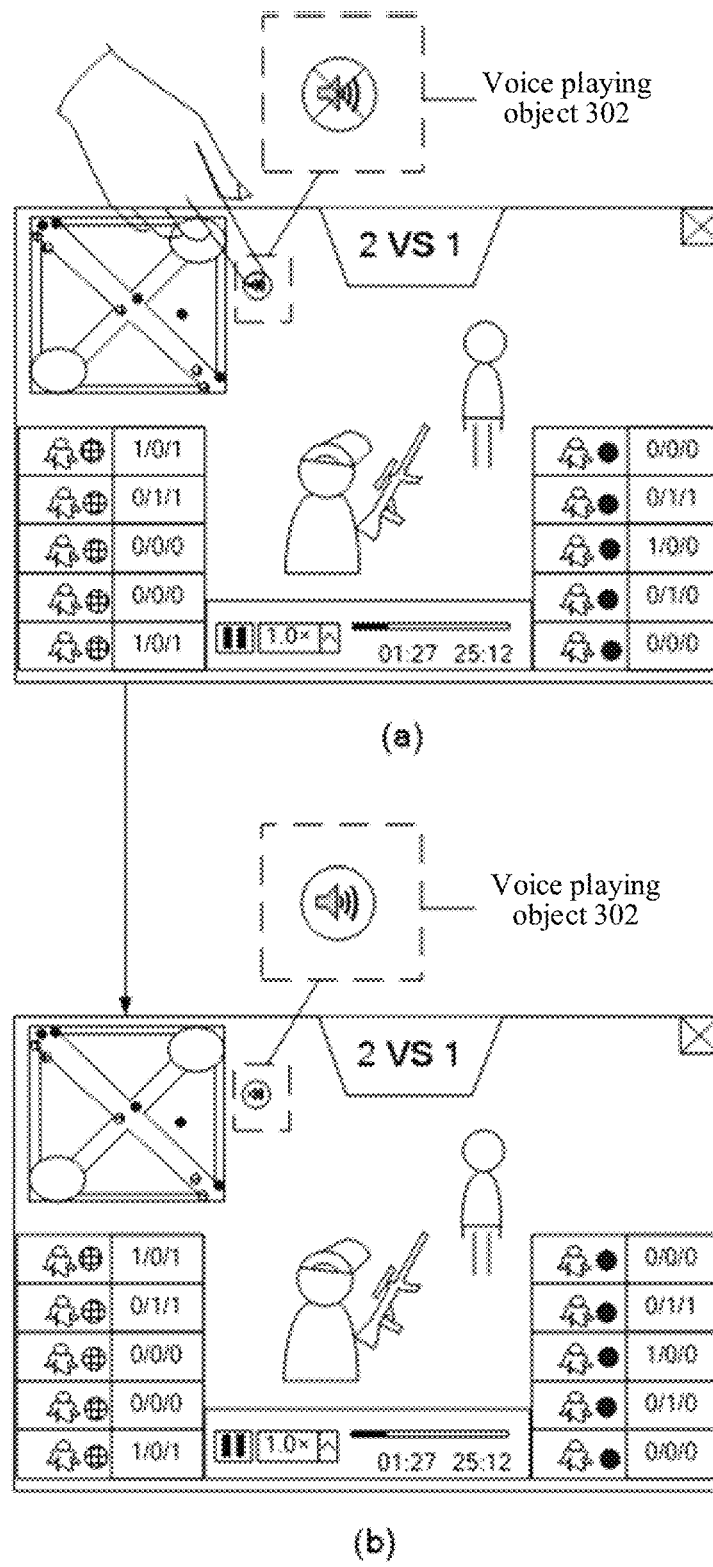
FIG. 4 is a diagram illustrating performance of a voice playing method according to an embodiment of the present disclosure.

Based on a scene shown in FIG. 3, as shown in FIG. 4, if the voice playing object 302 is currently in the off state, the first target operation performed on the voice playing object 302 in the off state is obtained in a scene shown in scene (a) in FIG. 4. Further, as shown in scene (b) in FIG. 4, the voice playing object 302 is set in the on state in response to the first target operation performed on the voice playing object 302 in the off state.

In some embodiments, the method further includes the following operations:
  Transmit, in a case that the voice playing object is in the on state and the setting information of the second account in the online game system indicates that listening to a voice of the first account is allowed, the voice generated by the first account during spectating in the game (which may be termed a "first voice") to user equipment to which the second account logs on for playing (which may be termed "second user equipment"); or
  Display a voice acquisition object in the user equipment to which the first account logs on in a case that the game picture of the game in which the first account spectates is displayed, the voice acquisition object being used in the on state for allowing transmission of a voice generated by the first account during spectating in the game to user equipment to which the second account logs on for playing, and transmit, in a case that the voice acquisition object is in the on state, the voice generated by the first account during spectating in the game to the user equipment to which the second account logs on for playing.

In some embodiments, setting information of an account in the online game system may be preset information of the account in user setting information of the online game system.

In some embodiments, setting information of an account in the online game system may be information of the account set for a game.

In some embodiments, the setting information may be setting information set for all accounts in the online game system to indicate whether the account listens to a voice of any user in all the accounts.

In some embodiments, the setting information may be setting information set for one or more specified accounts to indicate whether the account listens to a voice of a specified account.

In this embodiment, the voice playing object may but is not limited to be used for controlling voice playing (playing of the voice generated by the second account in the game) and voice transmission (transmission of the voice generated by the first account during spectating in the game to the user equipment to which the second account logs on for playing). For example, when the voice playing object is in the on state, whether to play the voice generated by the second account in the game or whether to transmit the voice generated by the first account during spectating in the game to the user equipment to which the second account logs on for playing is determined by a permission enabling situation of a second account side. That is, when the setting information of the second account in the online game system indicates that the first account is allowed to listen to the voice of the second account, the voice generated by the second account in the game is played. Alternatively, when the setting information of the second account in the online game system indicates that reception of the voice generated by the first account during spectating in the game is allowed, the voice generated by the first account during spectating in the game is transmitted to the user equipment to which the second account logs on for playing.

Transmission of the voice generated by the first account during spectating in the game to the second account is determined by whether the voice playing object is in the on state. Whether the second account plays the voice is determined by a playing permission of the second account side. For example, when the voice playing object is in the on state, and the second account disables the playing permission for the voice, the voice generated by the first account during spectating in the game is transmitted to the second account, but is not played.

In this embodiment, transmission of the voice generated by the first account during spectating in the game to the user equipment to which the second account logs on for playing may but is not limited to be determined by whether the voice playing object is in the on state and the playing permission of the second account side. For example, when the voice playing object is in the on state, and the second account disables the playing permission for the voice, transmission of the voice generated by the first account during spectating in the game to the user equipment to which the second account logs on for playing is banned.

In this embodiment, the voice playing object may but is not limited to be used for independently determining whether to play the voice generated by the second account in the game. The voice acquisition object may but is not limited to be used for independently determining whether to transmit the voice generated by the first account during spectating in the game to the user equipment to which the second account logs on for playing.

Figure 5:
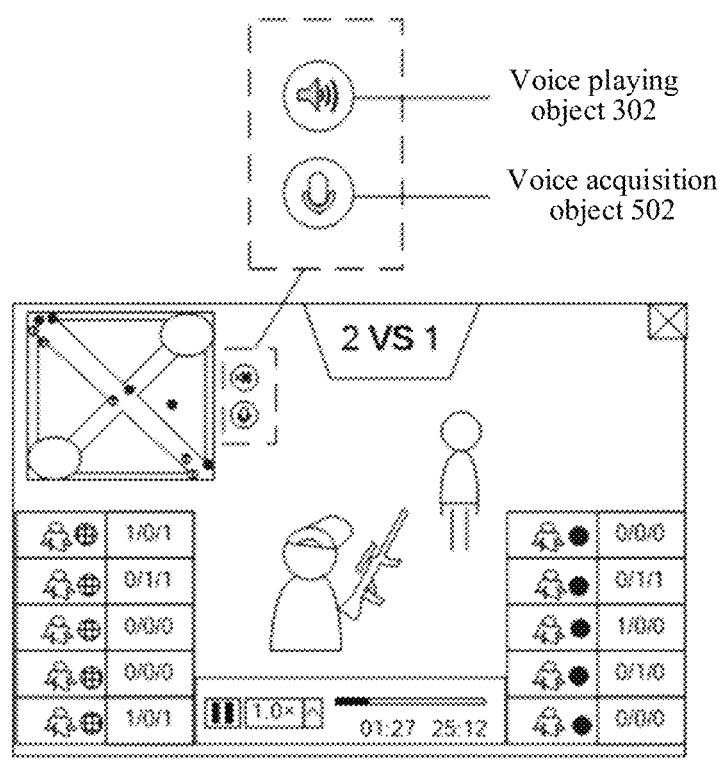
FIG. 5 is a diagram illustrating performance of a voice playing method according to an embodiment of the present disclosure.

Based on the scene shown in FIG. 3, as shown in FIG. 5, the voice playing object 302 and a voice acquisition object 502 are displayed in a case that the game picture of the game in which the first account spectates is displayed, the voice acquisition object 502 being used in the on state for allowing transmission of the voice generated by the first account during spectating in the game to the user equipment to which the second account logs on for playing. The voice generated by the second account in the game is played in the case that the voice playing object 302 is in the on state and the setting information of the second account in the online game system indicates that the first account is allowed to listen to the voice of the second account. The voice generated by the first account during spectating in the game is transmitted to the user equipment to which the second account logs on for playing in a case that the voice acquisition object 502 is in the on state.

In this embodiment, transmission of the voice generated by the first account during spectating in the game to the user equipment to which the second account logs on for playing may but is not limited to be related to only whether the voice acquisition object is in the on state but unrelated to whether the setting information of the second account in the online game system indicates that listening to the voice of the first account is allowed. In this embodiment, transmission of the voice generated by the first account during spectating in the game to the user equipment to which the second account logs on for playing may but is not limited to be related to both whether the voice acquisition object is in the on state and whether the setting information of the second account in the online game system indicates listening to the voice of the first account is allowed. For example, when the voice acquisition object is in the on state, and the setting information of the second account in the online game system indicates that listening to the voice of the first account is allowed, the voice generated by the first account during spectating in the game is transmitted to the user equipment to which the second account logs on for playing.

In some embodiments, the method further includes the following operations:
  Display, at the beginning of displaying of the game picture of the game in which the first account spectates, the voice acquisition object that defaults to the on state; or
  Set the voice acquisition object in the on state in response to a second target operation performed on the voice acquisition object in an off state.

In this embodiment, at the beginning of displaying of the game picture of the game in which the first account spectates, a status of the voice acquisition object may but is not limited to default to a specific fixed state, for example, the on state or the off state.

In this embodiment, the status of the voice acquisition object may be adjusted in response to the second target operation performed on the voice acquisition object. For example, the voice acquisition object is set in the on state in response to the second target operation performed on the voice acquisition object in the off state.

In some embodiments, before the operation of displaying a game picture of the game and a voice playing object, the method includes the following operations:
  Display N associated spectator entries, each of the N associated spectator entries being a spectator entry of a game in which a corresponding account in N accounts is participating, each of the N accounts being in association with the first account, the N accounts including the second account, and N being a natural number.
  Obtain a third target operation performed on a first associated spectator entry in the N associated spectator entries, the first associated spectator entry being a spectator entry of the game in which the second account is participating, and the third target operation being used for indicating that the first account selects to spectate in the game in which the second account is participating.

In this embodiment, an association may but is not limited to be used for representing a preset relationship between accounts, for example, a friend relationship, a teammate relationship, a closeness relationship, (for example, family, lover, or brother), a regional relationship (for example, geographical locations are close), or an operation object relationship (for example, game characters that the accounts adept at/like are the same or similar).

The N associated spectator entries are displayed, and in response to the third target operation performed on the first spectator entry in the N associated spectator entries, the first account is indicated to select to spectate in the game in which the second account is participating.

The friend relationship is used as an example. As shown in scene (a) in FIG. 6, a main interface of a virtual game of an account A is displayed, and a plurality of virtual icons are further displayed on the main interface, for example, three virtual icons displayed in the top-right corner: respectively a friend icon, a spectator icon, and a mailbox icon from left to right. It is assumed that a first selection operation performed on the spectator icon is obtained.

Figure 6:
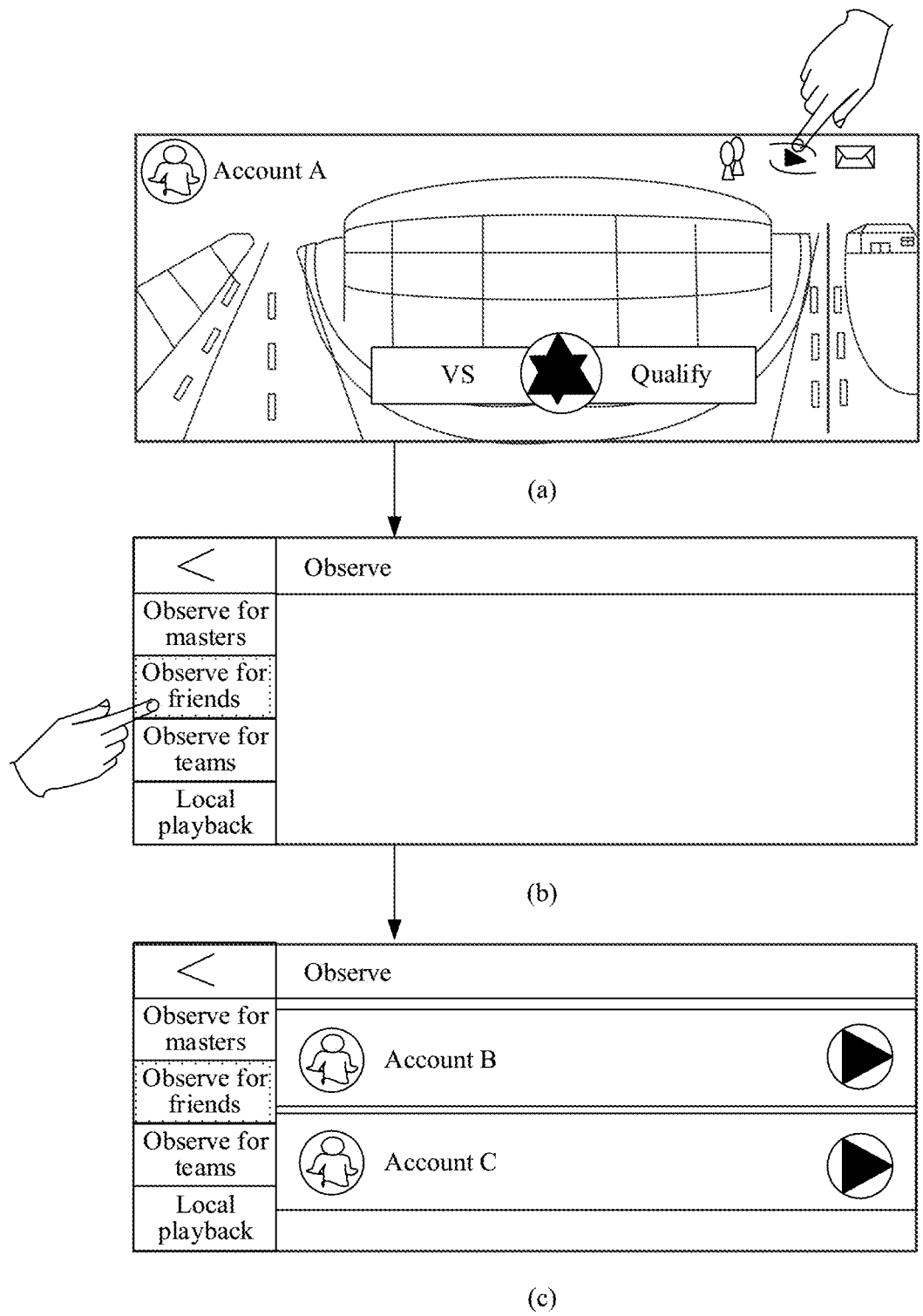
FIG. 6 is a diagram illustrating performance of a voice playing method according to an embodiment of the present disclosure.

In response to the first selection operation, as shown in scene (b) in FIG. 6, a spectator interface is displayed, and a spectating list is further displayed on the spectator interface, for example, spectating for recommendations, spectating for friends, spectating for teams, and local playback. It is assumed that a second selection operation performed on spectating for friends is obtained.

In response to the second selection operation, as shown in scene (c) in FIG. 6, a spectator sub-interface under a list of spectating for friends is displayed, and a plurality (here, two) spectator entries are displayed on the spectator sub-interface. The spectator entries correspond to an account B and an account C respectively. Both the account B and the account C are friend accounts of the account A. It is assumed that the third target operation is performed on the spectator entry corresponding to the account B to further indicate that the account A spectates in a game in which the account B is participating.

According to an embodiment of the disclosure, the N associated spectator entries are displayed, each of the N associated spectator entries being the spectator entry of the game in which the corresponding account in the N accounts is participating, each of the N accounts being in association with the first account, the N accounts including the second account, and N being a natural number. The third target operation performed on the first associated spectator entry in the N associated spectator entries is obtained, the first associated spectator entry being the spectator entry of the game in which the second account is participating, and the third target operation being used for indicating that the first account selects to spectate in the game in which the second account is participating. This achieves a purpose of quickly spectating in a game in which an associated account is participating, enhances the capability of the online game system in providing the online game service, and improves the performance of the online game system.

In some embodiments, the operation of transmitting, in a case that the voice playing object is in the on state and the setting information of the second account in the online game system indicates that listening to a voice of the first account is allowed, the voice generated by the first account during spectating in the game to user equipment to which the second account logs on for playing includes:

transmitting, in a case that the first account is in association with the second account, the voice playing object is in the on state, and the setting information of the second account in the online game system indicates that listening to the voice of the first account is allowed, the voice generated by the first account during spectating in the game to the user equipment to which the second account logs on for playing.

In this embodiment, in a scene in which the first account is in association with the second account, transmission of the voice generated by the first account during spectating in the game to the user equipment to which the second account logs on for playing may but is not limited to be determined by whether the voice playing object is in the on state and whether the setting information of the second account in the online game system indicates that listening to the voice of the first account is allowed.

In this embodiment, when the first account is in association with the second account, if the voice playing object is in the on state, and the current setting information of the second account indicates that listening to the voice of the first account is not allowed, the electronic device may but is not limited to send prompt information to the user equipment to which the second account logs on, to indicate that the first account in association is currently spectating and the voice playing object is in the on state.

In some embodiments, the operation of displaying a voice acquisition object in a case that the game picture of the game in which the first account spectates is displayed includes:

displaying the voice acquisition object in the user equipment to which the first account logs on in a case that the first account is in association with the second account and the game picture of the game in which the first account spectates is displayed.

In this embodiment, considering that the first account and the second account are in association in addition to a spectator-game player relationship, voice transmission may be preferable for the first account and the second account. Therefore, in addition to the voice playing object, the voice acquisition object may be further displayed.

In some embodiments, the method further includes that:
transmission of a voice generated by the first account during spectating in the game to user equipment to which the second account logs on for playing is banned in a case that the game picture of the game in which the first account spectates is displayed.

Since there may be a plurality of first accounts, for the second account, if the voice generated by the first account during spectating in the game is directly allowed to be transmitted to the user equipment to which the second account logs on for playing, it is very likely that there is excessive voice data, affecting the game progress of the second account. Further, banning, in the case that the game picture of the game in which the first account spectates is displayed, transmission of the voice generated by the first account during spectating in the game to the user equipment to which the second account logs on for playing can reduce impact of voice transmission on the game progress of the second account.

In some embodiments, before the operation of displaying a game picture of the game and a voice playing object, the method includes the following operations:

Display M recommended spectator entries, each of the M recommended spectator entries being a spectator entry of a game in which a corresponding account in M accounts is participating, the M accounts including the second account, and M being a natural number.

Obtain a fourth target operation performed on a first recommended spectator entry in the M recommended spectator entries, the first recommended spectator entry being a spectator entry of the game in which the second account is participating, and the fourth target operation being used for indicating that the first account selects to spectate in the game in which the second account is participating.

In this embodiment, each account may have one or more game attributes, for example, a K (kill) D (death) A (assist) value, in a game in which the account currently participates, and is recommended to a spectator at a specific probability when game data satisfies a preset threshold.

Figure 7:
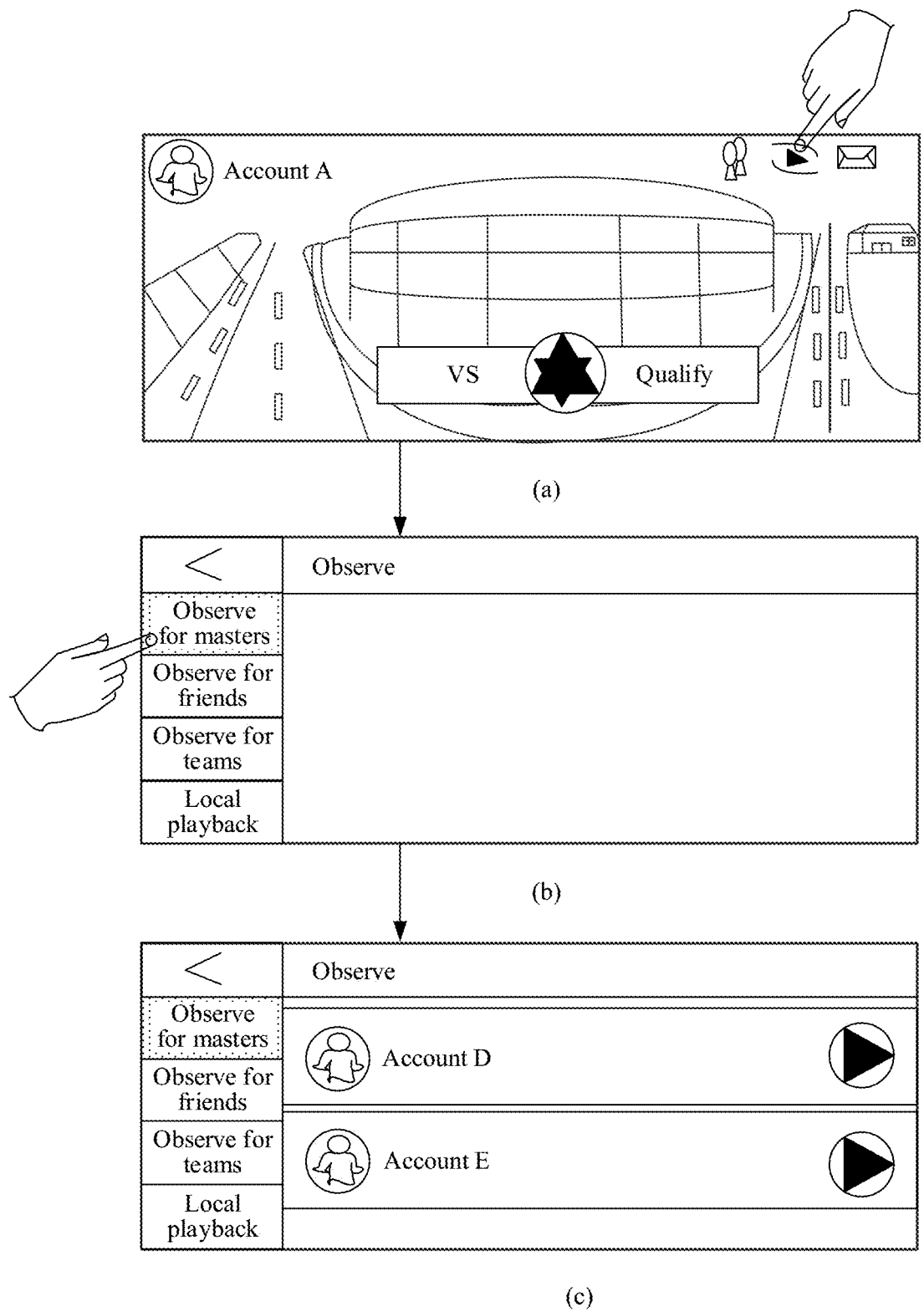
FIG. 7 is a diagram illustrating performance of a voice playing method according to an embodiment of the present disclosure.

Spectating for recommendations is used as an example for description, as shown in scene (a) in FIG. 7. First, as shown in scene (a) in FIG. 7, a main interface of a virtual game of an account A is displayed, and a plurality of virtual icons are further displayed on the main interface, for example, three virtual icons displayed in the top-right corner: respectively a friend icon, a spectator icon, and a mailbox icon from left to right. It is assumed that a first selection operation performed on the spectator icon is obtained.

In response to the first selection operation, as shown in scene (b) in FIG. 7, a spectator interface is displayed, and a spectating list is further displayed on the spectator interface, for example, spectating for recommendations, spectating for friends, spectating for teams, and local playback. It is assumed that a second selection operation performed on spectating for recommendations is obtained.

In response to the second selection operation, as shown in scene (c) in FIG. 7, a spectator sub-interface below a list of spectating for recommendations is displayed, and a plurality (here, two) spectator entries are displayed on the spectator sub-interface. The spectator entries correspond to an account D and an account E respectively. Both the account D and the account E are "recommended accounts". It is assumed that the fourth target operation is performed on the spectator entry corresponding to the account D to further indicate that the account A spectates in a game in which the account D is participating.

According to an embodiment of the disclosure, the M recommended spectator entries are displayed, each of the M recommended spectator entries being the spectator entry of the game in which the corresponding account in the M accounts is participating, the M accounts including the second account, and M being a natural number. The fourth target operation performed on the first recommended spectator entry in the M recommended spectator entries is obtained, the first recommended spectator entry being the spectator entry of the game in which the second account is participating, and the fourth target operation being used for indicating that the first account selects to spectate in the game in which the second account is participating. This achieves a purpose of quickly spectating in a game in which a recommended account is participating, and improves running efficiency of the online game system.

In some embodiments, during the operation of displaying a game picture of the game, the method further includes at least one of the following operations:

Play, in the user equipment to which the first account logs on, a voice generated by a third account spectating in the game.

Play, in the user equipment to which the first account logs on, a voice generated by a fourth account participating in the game, the second account and the fourth account being of a same faction during participation in the game.

Play, in the user equipment to which the first account logs on, a voice generated by a fifth account participating in the game, the second account and the fifth account being of different factions during participation in the game.

In this embodiment, as a spectator, the first account may play, in addition to playing the voice generated by the second account in the game, a voice of another spectator, for example, the voice generated by the third account spectating in the game.

In this embodiment, as a spectator, in addition to playing the voice generated by the second account in the game, the first account may further play a voice of an account that participates in the same game and is of the same faction as the second account, for example, play the voice generated by the fourth account participating in the game.

In this embodiment, as a spectator, in addition to playing the voice generated by the second account in the game, the first account may further play a voice of an account that participates in the same game and is of a different faction from the second account, for example, play the voice generated by the fifth account participating in the game.

The voice generated by the third account spectating in the game is played. The voice generated by the fourth account participating in the game is played, the second account and the fourth account being of the same faction during participation in the game. The voice generated by the fifth account participating in the game is played, the second account and the fifth account being of different factions during participation in the game.

Figure 8:
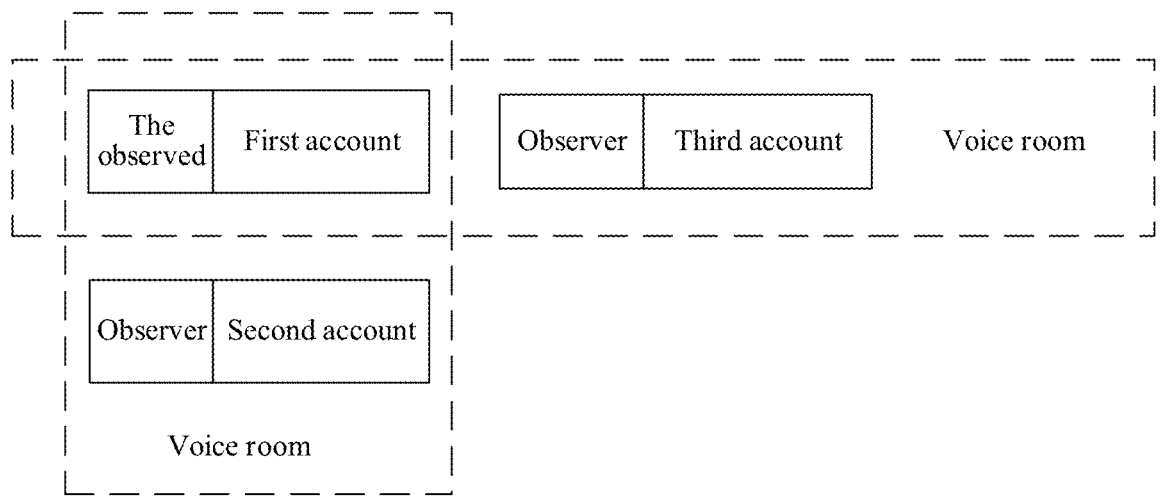
FIG. 8 is a diagram illustrating performance of a voice playing method according to an embodiment of the present disclosure.

The following uses a virtual voice room as an example for description. Each virtual voice room corresponds to a double-user or multiuser voice chat conversation in the online game system, and may be displayed as a specific chat interface in a user interface of the online game system. Voice transmission is allowed between accounts in each virtual voice room. The virtual voice rooms are independent and unassociated. That is, voice transmission is not allowed between accounts in different virtual voice rooms. As shown in FIG. 8, voice transmission may be performed between a game player (the first account) and a spectator (the third account) in the same virtual voice room, or voice transmission may be performed between the game player (the first account) and a spectator (the second account) in the same virtual voice room, but voice transmission may be prevented between the third account and the second account in different virtual voice rooms.

Figure 9:
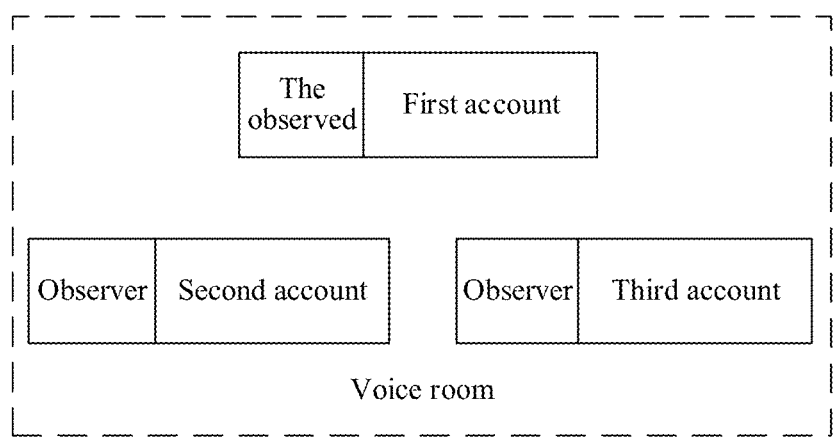
FIG. 9 is a diagram illustrating performance of a voice playing method according to an embodiment of the present disclosure.

As shown in FIG. 9, voice transmission may be performed between the game player (the first account) and the spectators (the second account and the third account) in the same virtual voice room.

Figure 10:
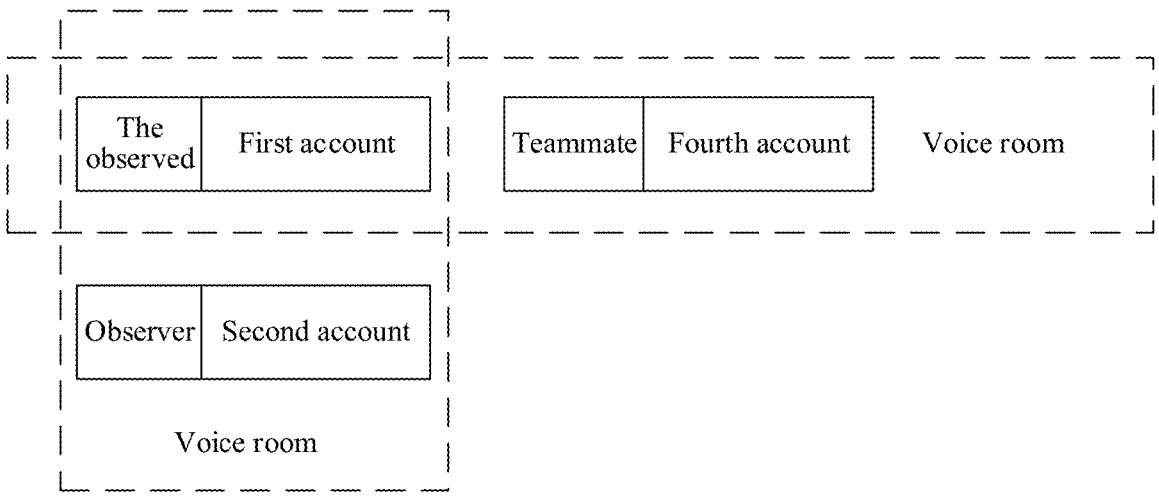
FIG. 10 is a diagram illustrating performance of a voice playing method according to an embodiment of the present disclosure.

As shown in FIG. 10, voice transmission may be performed between game players (the first account and the fourth account) in the same virtual voice room (for example, in-team voice), or voice transmission may be performed between the game player (the first account) and the spectator (the second account) in the same virtual voice room, but voice transmission may be prevented between the fourth account and the second account in different virtual voice rooms.

According to an embodiment of the disclosure, the voice generated by the third account spectating in the game is played. The voice generated by the fourth account participating in the game is played, the second account and the fourth account being of the same faction during participation in the game. The voice generated by the fifth account participating in the game is played, the second account and the fifth account being of different factions during participation in the game. The foregoing functions are supported, so that the capability of the online game system in providing the online game service is enhanced, and the performance of the online game system is improved.

The following uses application of the voice playing method to the MOBA game scene as an example for description.

For a scene in which a plurality of spectators watch a host play a game as a game player, for example, the game is recommended to the spectators, single-channel voice transmission is performed, that is, the game player speaks, and the spectators listen. For a spectator interface of the spectator, there is an additional spectator speaker function that defaults to on to listen to what the game player speaks after turning on a microphone. For a game combat page of the game player, when this game is recommended to spectating for spectators, there is an additional microphone function (which does not disappear in this game), the microphone defaults to off, and a voice is transmitted to the game player after the microphone is turned on.

Spectating for friends is a social scene. The spectator and the game player may communicate, that is, the game player speaks and listens, and the spectator also speaks and listens. Specifically, for a spectator page of the spectator, there are additional spectator speaker and spectator microphone functions, a speaker defaults to on, and the microphone defaults to off. The spectator speaker may listen to what the game player speaks, and the spectator microphone transmits a voice to the game player. For a game combat page of the game player, when a friend watches the game player in this game, there are additional spectator speaker and spectator microphone functions (which do not disappear in this game), a speaker defaults to on, and a microphone defaults to off. The spectator speaker may listen to what the spectator speaks, and the spectator microphone transmits a voice to the spectator.

Figure 11:
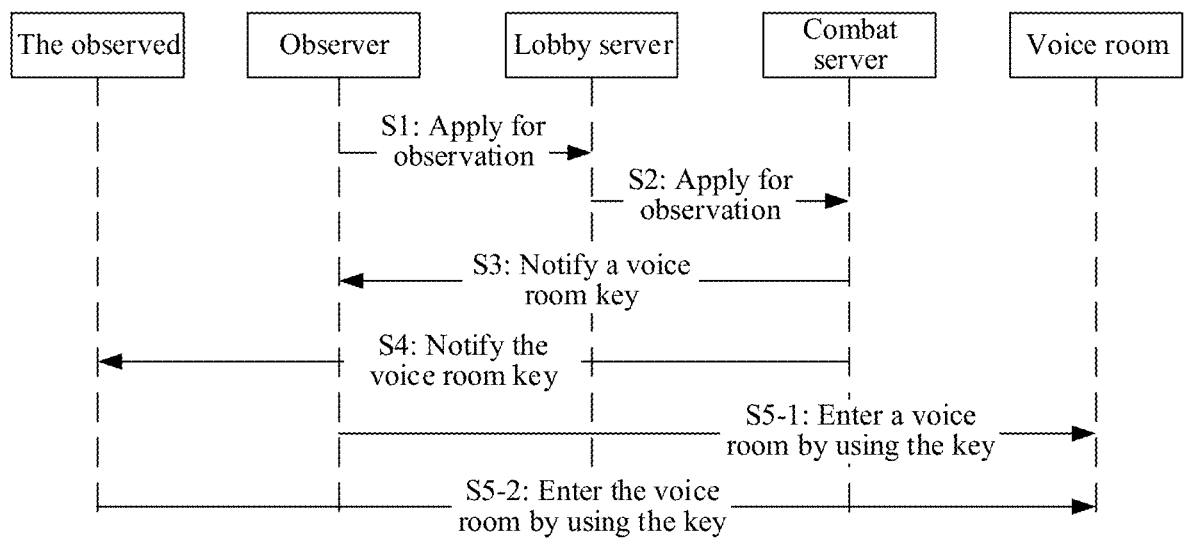
FIG. 11 is a diagram illustrating performance of a voice playing method according to an embodiment of the present disclosure.

As shown in FIG. 11, a method for voice communication between a spectator and a game player may be switched in five environments: the game player, the spectator, a lobby server, a combat server, and a voice server. In operations S1 and S2, the spectator selects the game player intended to play a game from a spectating list with two entries, and requests spectating. Whether a current quantity of spectators may be supported is checked in the combat server. If the current quantity of spectators is supported, spectating may be directly rejected (spectating for recommendations is oriented to players of all the servers, there may be overflow in the combat server, and if it is determined that the current quantity of spectators is be supported, spectating may be rejected). Then, in operations S3 to S4, a virtual voice room key is sent to the spectator and the game player responsive to a valid request (the same player may be in a plurality of virtual voice rooms, and there is no interference between different virtual voice room). Finally, in operations S5-1 and S5-2, a virtual voice room is entered by using the key.

In a conventional manner of spectating in the MOBA game, the spectator enters an independent and separate scene, and cannot perform any effective interaction in a spectating process, the process is boring, and a psychological threshold of spectating is high. According to this embodiment, communication between the spectator and the game player and communication between spectators are both implemented, an interaction frequency is increased, and increase of spectating utilization is promoted.

Figure 12:
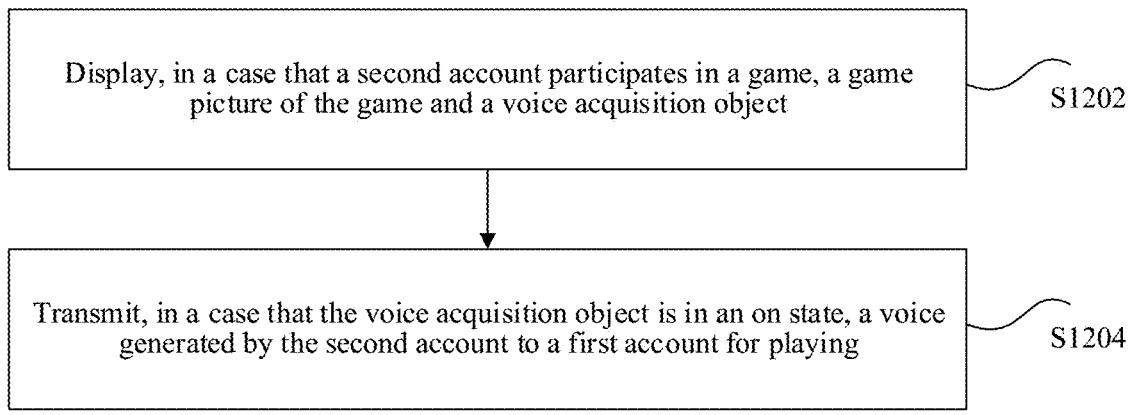
FIG. 12 is a schematic flowchart of a voice transmission method according to an embodiment of the present disclosure.

In some embodiments, as shown in FIG. 12, a voice transmission method may include the following operations:

S1202: Display, in a case that a second account participates in a game, a game picture of the game and a voice acquisition object in user equipment to which the second account logs on, the voice acquisition object being used in an on state for allowing transmission of a voice generated by the second account participating in the game to user equipment to which a first account spectating in the game logs on.

S1204: Transmit, in a case that the voice acquisition object is in the on state, the voice generated by the second account to the user equipment to which the first account logs on for playing.

The method may be performed by an electronic device, for example, user equipment or a server. When the method is performed by the user equipment, some operations are implicitly implemented under assistance of the server. For example, the user equipment obtains, from the server, and plays voice data to be played. When the method is performed by the server, some operations are implicitly implemented under assistance of the user equipment. For example, the server provides voice data to be played for the user equipment, for the user equipment to play.

The voice playing method and the voice transmission method of each embodiment may be implemented by the same user equipment. That is, a piece of physical user equipment may perform both the voice playing method and the voice transmission method. For example, when an account logging on to user equipment selects to spectate in a game, the user equipment may perform the voice playing method of each embodiment. When an account logging on to user equipment selects to participate in a game as a player, the user equipment may perform the voice transmission method of each embodiment. For similar reasons, an apparatus and an electronic device of each embodiment may have both functions of performing the voice playing method of each embodiment and the voice transmission method of each embodiment.

In this embodiment, the foregoing method may be applied but is not limited to a MOBA game scene. For example, in a running process of a MOBA game, both opposing sides operate game characters in the game as actual participants, and another user who does not belong to both opposing sides may watch the game as a non-opponent, and cannot operate a game character. By the foregoing method, one or more channels supporting voice transmission are provided for a watcher who watches in the game as a non-opponent and a watched one who is an actual participant. Therefore, the watcher may receive a voice generated by the game player in the current MOBA game. Likewise, the game player may but is not limited to receive a voice generated by the watcher before/during/after running of the current MOBA game.

In this embodiment, the first account is a spectator account spectating in the game, and the second account is a game player account participating in the game. If the first account and the second account are friends, a user of the first account may select to perform voice transmission with the second account currently playing the game by chatting privately with the friend, but in the related art, the first account needs to temporarily quit a spectator interface of the game and call a voice transmission channel or interface for chatting privately with the friend. An operation is complex.

In this embodiment, in a case that a voice playing object is in the on state and setting information of the second account in the online game system indicates that the first account is allowed to listen to the voice of the second account, the first account may play the voice generated by the second account in the game without quitting the spectator picture of the game. This eliminates a complex operation, enhances a capability of the online game system in providing an online game service, and improves performance of the online game system.

In this embodiment, the voice acquisition object may but is not limited to be understood as a voice acquisition identifier displayed on the game picture, for example, a virtual microphone identifier, a virtual receiver identifier, a virtual ear identifier, or a virtual lip identifier. In addition, the voice acquisition object may be in but is not limited to a plurality of states, for example, the on state, an off state, a banned state, or a chilled state. When the voice acquisition object is in the off state, the electronic device may but is not limited to not acquire the voice generated by the second account in the game. When the voice acquisition object is in the off state, and an enabling operation triggered on the voice acquisition object is obtained, the electronic device may but is not limited to adjust the voice acquisition object to the on state. When the voice acquisition object is in the banned state, the electronic device may but is not limited to not acquire the voice generated by the second account in the game, and when an enabling operation triggered on the voice acquisition object is obtained, the electronic device may but is not limited to keep the voice acquisition object in the banned state; that is, acquisition and transmission of the voice may remain disabled. When the voice acquisition object is in the chilled state, the electronic device may but is not limited to not acquire the voice generated by the second account in the game, and when an enabling operation triggered on the voice acquisition object is obtained, and duration of the chilled state does not reach preset duration, the electronic device may but is not limited to keep the voice acquisition object in the chilled state.

When the first account spectates in the game, the voice playing object for voice transmission is provided, and a status of the voice acquisition object is determined to efficiently transmit the voice generated by the second account to the user equipment to which the first account logs on for playing. This enhances the capability of the online game system in providing the online game service and improves the performance of the online game system.

According to the voice transmission method for a spectator and a game player in this embodiment of the present disclosure, compared with a manner in the related art in which the spectator needs to quit the game in which the spectator currently spectates and then transmits the voice by using another chat channel, the present disclosure has the advantages that the spectator directly implements voice transmission in the game without calling other voice transmission, which reduces a complex channel adjustment operation of the spectator, and the game player also does not need to switch a current game interface to a chat interface for voice transmission. Therefore, the capability of the online game system in providing the online game service is enhanced, and the performance of the online game system is improved.

Figure 13:
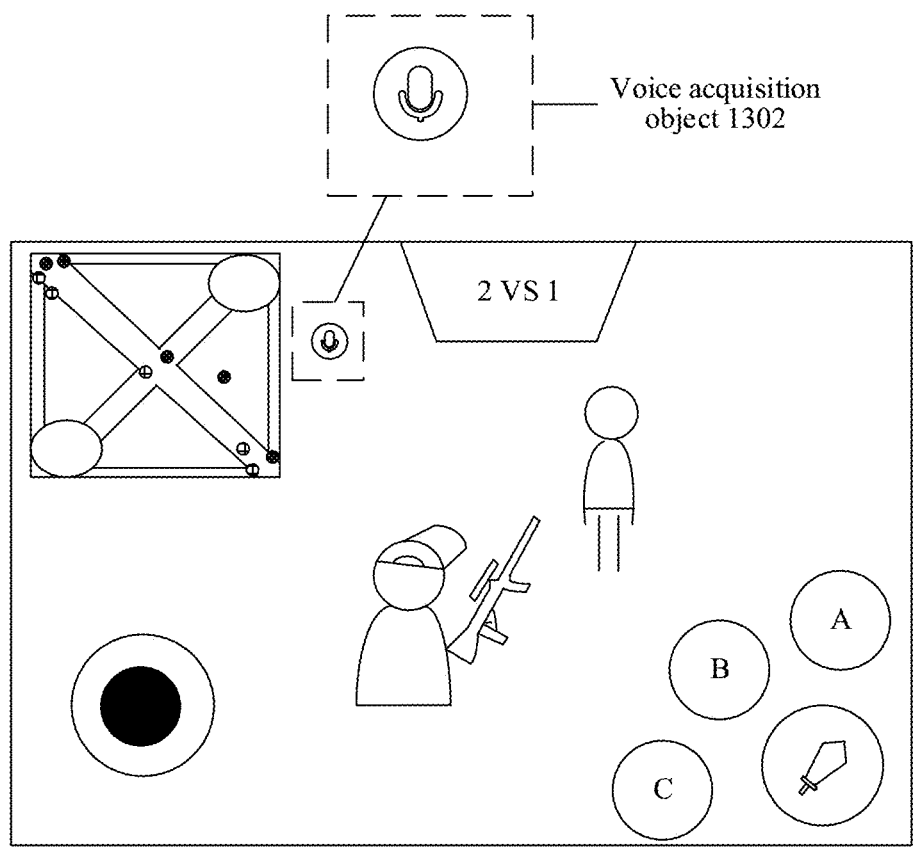
FIG. 13 is a diagram illustrating performance of a voice transmission method according to an embodiment of the present disclosure.

As shown in FIG. 13, the game picture of the game in which the second account participates and a voice acquisition object 1302 are displayed, the voice acquisition object 1302 being used in the on state for allowing, in a case that setting information of the first account spectating in the game in the online game system indicates that listening to the voice of the second account is allowed, transmission of the voice generated by the second account to the user equipment to which the first account spectating in the game logs on for playing. The voice generated by the second account is transmitted to the user equipment to which the first account logs on for playing in the case that the voice acquisition object 1302 is in the on state and the setting information of the first account in the online game system indicates that listening to the voice of the second account is allowed.

In addition, in this embodiment, a total of ten game accounts of both opposing sides are displayed in the game picture of the game in which the second account (the spectator) participates, and the ten game accounts are divided into two factions, each of which is allocated with five game accounts. Based on this, the second account (the game player) may be but is not limited to one of the ten game accounts, or may be but is not limited to all the game accounts in one of the two factions, or may be but is not limited to all the ten game accounts.

In an embodiment of the disclosure, the game picture of the game in which the second account participates and the voice acquisition object are displayed in the case that the second account participates in the game, the voice acquisition object being used in the on state for allowing, in the case that the setting information of the first account spectating in the game in the online game system indicates that listening to the voice of the second account is allowed, transmission of the voice generated by the second account to the user equipment to which the first account spectating in the game logs on for playing. The voice generated by the second account is transmitted to the user equipment to which the first account logs on for playing in a case that the voice acquisition object is in the on state and the setting information of the first account in the online game system indicates that listening to the voice of the second account is allowed. Therefore, the capability of the online game system in providing the online game service is enhanced, and the performance of the online game system is improved.

In some embodiments, the method may further include the following operations:

Display, in the user equipment to which the second account logs on at the beginning of displaying of the game picture of the game in which the second account participates, the voice acquisition object that defaults to the on state; or Set the voice acquisition object in an acquisition state in response to a first target operation performed on the voice acquisition object in an off state.

In this embodiment, at the beginning of displaying of the game picture of the game in which the second account participates, a status of the voice acquisition object may but is not limited to default to a specific fixed state, for example, the on state or the off state.

In this embodiment, the status of the voice acquisition object may be adjusted in response to the first target operation performed on the voice acquisition object. For example, the voice acquisition object is set in the on state in response to the first target operation performed on the voice acquisition object in the off state.

A specific embodiment may refer to the example shown in the foregoing voice playing method, and will not be elaborated herein in this example.

In some embodiments, the method may further include the following operations:

Play, in the user equipment to which the second account logs on in a case that the voice acquisition object is in the on state and the setting information of the first account in the online game system indicates that transmission of the voice generated by the first account to the second account is allowed, the voice generated by the first account during spectating in the game.

Display a voice playing object in the user equipment to which the second account logs on in a case that the game picture of the game in which the second account participates is displayed, the voice playing object being used in the on state for allowing playing of the voice generated by the first account spectating in the game, and play, in the user equipment to which the second account logs on in a case that the voice playing object is in the on state and the setting information of the first account in the online game system indicates that transmission of the voice generated by the first account to the user equipment to which the second account logs on is allowed, the voice generated by the first account during spectating in the game.

In this embodiment, the voice acquisition object may but is not limited to be used for controlling voice acquisition (acquisition of the voice generated by the second account in the game) and voice transmission (transmission of the voice generated by the second account during participation in the game to the user equipment to which the first account logs on for playing).

Figure 14:
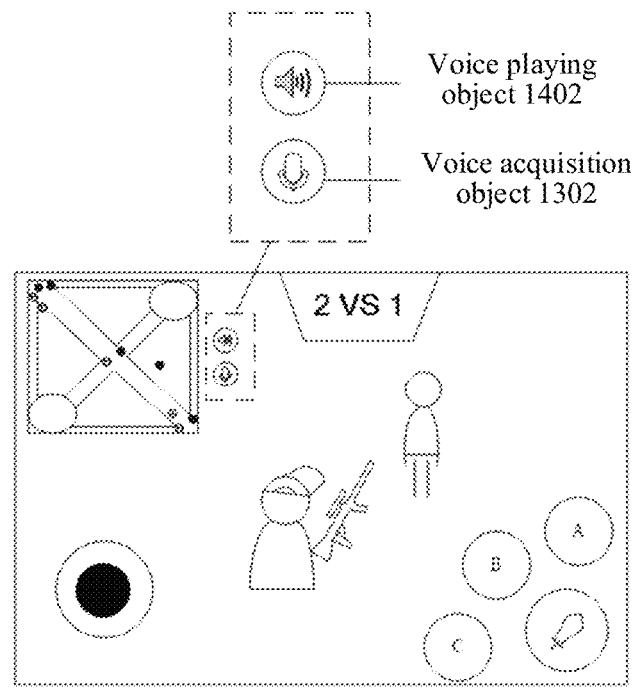
FIG. 14 is a diagram illustrating performance of a voice transmission method according to an embodiment of the present disclosure.

Based on a scene shown in FIG. 13, as shown in FIG. 14, a voice playing object 1402 and the voice acquisition object 1302 are displayed in the user equipment to which the second account logs on in the case that the game picture of the game in which the second account participates is displayed, the voice playing object 1402 being used in the on state for allowing playing of the voice generated by the first account spectating in the game. The voice generated by the first account during spectating in the game is played in the user equipment to which the second account logs on in a case that the voice playing object 1402 is in the on state and the setting information of the first account in the online game system indicates that transmission of the voice generated by the first account to the user equipment to which the second account logs on is allowed.

In some embodiments, the method may further include the following operations:

Display, in the user equipment to which the second account logs on at the beginning of displaying of the game picture of the game in which the second account participates, the voice playing object that defaults to the on state; or Set the voice playing object in the on state in response to a second target operation performed on the voice playing object in an off state.

A specific embodiment may refer to the example shown in the foregoing voice playing method, and will not be elaborated herein in this example.

In some embodiments, the operation of playing, in a case that the voice acquisition object is in the on state and the setting information of the first account in the online game system indicates that transmission of the voice generated by the first account to the user equipment to which the second account logs on is allowed, the voice generated by the first account during spectating in the game includes:

playing, in the user equipment to which the second account logs on in a case that the first account is in association with the second account, the voice acquisition object is in the on state, and the setting information of the first account in the online game system indicates that transmission of the voice generated by the first account to the user equipment to which the second account logs on is allowed, the voice generated by the first account during spectating in the game.

A specific embodiment may refer to the example shown in the foregoing voice playing method, and will not be elaborated herein in this example.

In some embodiments, the operation of displaying a game picture of the game and a voice acquisition object includes:

displaying the voice playing object in the user equipment to which the second account logs on in a case that the first account is in association with the second account and the game picture of the game in which the second account participates is displayed.

A specific embodiment may refer to the example shown in the foregoing voice playing method, and will not be elaborated herein in this example.

In some embodiments, the method includes that:

playing of a voice generated by the first account during spectating in the game is banned in a case that the game picture of the game in which the second account participates is displayed.

A specific embodiment may refer to the example shown in the foregoing voice playing method, and will not be elaborated herein in this example.

In some embodiments, during the operation of displaying a game picture of the game, the method may further include at least one of the following operations:

Transmit the voice generated by the second account to user equipment to which a third account spectating in the game logs on.

Transmit the voice generated by the second account to user equipment to which a fourth account participating in the game logs on, the second account and the fourth account being of a same faction during participation in the game.

Transmit the voice generated by the second account to user equipment to which a fifth account participating in the game logs on, the second account and the fifth account being of different factions during participation in the game.

A specific embodiment may refer to the example shown in the foregoing voice playing method, and will not be elaborated herein in this example.

For brevity of description, each method embodiment is expressed into a combination of a series of actions. However, it will be understood by a person skilled in the art that the present disclosure is not limited to an action sequence described herein because some operations may be performed in another sequence, or concurrently, according to the present disclosure. Second, it will also be understood by a person skilled in the art that the embodiments disclosed herein are preferred embodiments, and involved actions and modules are not always necessary to the present disclosure.

According to another aspect of the present disclosure, a voice playing apparatus for implementing the foregoing method is also provided.

Some embodiments provide a voice playing apparatus, which may include:

a display unit, configured to display, in a case that a first account in an online game system selects to spectate in a game, a game picture of the game and a voice playing object in user equipment to which the first account logs on, the voice playing object being used in an on state for allowing the user equipment to play a voice generated by a second account participating in the game; and a playing unit, configured to play, in the user equipment to which the first account logs on in a case that the voice playing object is in the on state and setting information of the second account in the online game system indicates that the first account is allowed to listen to the voice of the second account, the voice generated by the second account in the game.

In some embodiments, a voice transmission apparatus may include:

a display unit, configured to display, in a case that a second account in an online game system participates in a game, a game picture of the game and a voice acquisition object in user equipment to which the second account logs on, the voice acquisition object being used in an on state for allowing, in a case that setting information of a first account spectating in the game in the online game system indicates that listening to a voice of the second account is allowed, transmission of the voice generated by the second account to user equipment to which the first account spectating in the game logs on for playing; and a transmission unit, configured to transmit, in a case that the voice acquisition object is in the on state and the setting information of the first account in the online game system indicates that listening to the voice of the second account is allowed, the voice generated by the second account to the user equipment to which the first account logs on for playing.

Figure 15:
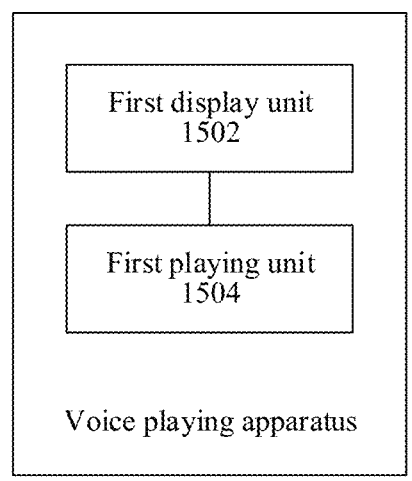
FIG. 15 is a schematic diagram of a voice playing apparatus according to an embodiment of the present disclosure.

In some embodiments, as shown in FIG. 15, the voice playing apparatus may include:

a first display unit 1502, configured to display, in a case that a second account in an online game system participates in a game, a game picture of the game and a voice playing object in user equipment to which a first account logs on, the voice playing object being used in an on state for allowing playing of a voice generated by the second account participating in the game; and a first playing unit 1504, configured to play, in the user equipment to which the first account logs on in a case that the voice playing object is in the on state and setting information of the second account in the online game system indicates that the first account is allowed to listen to the voice of the second account, the voice generated by the second account in the game.

A specific embodiment may refer to the example shown in the foregoing voice playing method, and will not be elaborated herein in this example.

In some embodiments, the apparatus further includes:

a second display unit, configured to display, at the beginning of displaying of the game picture of the game in which the first account spectates, the voice playing object that defaults to the on state; or a first setting unit, configured to set the voice playing object in the on state in response to a first target operation performed on the voice playing object in an off state.

In some embodiments, the apparatus further includes:

a first transmission unit, configured to transmit, in a case that the voice playing object is in the on state and the setting information of the second account in the online game system indicates that listening to a voice of the first account is allowed, the voice generated by the first account during spectating in the game to user equipment to which the second account logs on for playing; or a third display unit, configured to display a voice acquisition object in the user equipment to which the first account logs on in a case that the game picture of the game in which the first account spectates is displayed, the voice acquisition object being used in the on state for allowing transmission of a voice generated by the first account during spectating in the game to user equipment to which the second account logs on for playing, and transmit, in a case that the voice acquisition object is in the on state, the voice generated by the first account during spectating in the game to the user equipment to which the second account logs on for playing.

A specific embodiment may refer to the example shown in the foregoing voice playing method, and will not be elaborated herein in this example.

In some embodiments, the apparatus further includes:

a fourth display unit, configured to display, in the user equipment to which the first account logs on at the beginning of displaying of the game picture of the game in which the first account spectates, the voice acquisition object that defaults to the on state; or a second setting unit, configured to set the voice acquisition object in the on state in response to a second target operation performed on the voice acquisition object in an off state.

A specific embodiment may refer to the example shown in the foregoing voice playing method, and will not be elaborated herein in this example.

In some embodiments, the apparatus includes:

a fifth display unit, configured to display N associated spectator entries before displaying of the game picture of the game in which the first account spectates and the voice playing object, each of the N associated spectator entries being a spectator entry of a game in which a corresponding account in N accounts is participating, each of the N accounts being in association with the first account, the N accounts including the second account, and N being a natural number; and an obtaining unit, configured to obtain, before displaying of the game picture of the game in which the first account spectates and the voice playing object, a third target operation performed on a first associated spectator entry in the N associated spectator entries, the first associated spectator entry being a spectator entry of the game in which the second account is participating, and the third target operation being used for indicating that the first account selects to spectate in the game in which the second account is participating.

A specific embodiment may refer to the example shown in the foregoing voice playing method, and will not be elaborated herein in this example.

In some embodiments, the first transmission unit includes:

a first playing module, configured to transmit, in a case that the first account is in association with the second account, the voice playing object is in the on state, and the setting information of the second account in the online game system indicates that listening to the voice of the first account is allowed, the voice generated by the first account during spectating in the game to the user equipment to which the second account logs on for playing.

A specific embodiment may refer to the example shown in the foregoing voice playing method, and will not be elaborated herein in this example.

In some embodiments, the third display unit includes:

a first display module, configured to display the voice acquisition object in the user equipment to which the first account logs on in a case that the first account is in association with the second account and the game picture of the game in which the first account spectates is displayed.

A specific embodiment may refer to the example shown in the foregoing voice playing method, and will not be elaborated herein in this example.

In some embodiments, the apparatus further includes:

a first banning unit, configured to ban, in a case that the game picture of the game in which the first account spectates is displayed, transmission of a voice generated by the first account during spectating in the game to user equipment to which the second account logs on for playing.

A specific embodiment may refer to the example shown in the foregoing voice playing method, and will not be elaborated herein in this example.

In some embodiments, the apparatus includes:

a sixth display unit, configured to display M recommended spectator entries before displaying of the game picture of the game in which the first account spectates and the voice playing object, each of the M recommended spectator entries being a spectator entry of a game in which one of M accounts selected and recommended from accounts playing games in the online game system is participating, the M accounts including the second account, and M being a natural number; and an obtaining unit, configured to obtain, before displaying of the game picture of the game in which the first account spectates and the voice playing object, a fourth target operation performed on a first recommended spectator entry in the N recommended spectator entries, the first recommended spectator entry being a spectator entry of the game in which the second account is participating, and the fourth target operation being used for indicating that the first account selects to spectate in the game in which the second account is participating.

A specific embodiment may refer to the example shown in the foregoing voice playing method, and will not be elaborated herein in this example.

In some embodiments, at least one of the following is included:
- a second playing unit, configured, during playing of the voice generated by the second account in the game, to play in the user equipment to which the first account logs on, a voice generated by a third account spectating in the game;
- a third playing unit, configured, during playing of the voice generated by the second account in the game, to play, in the user equipment to which the first account logs on, a voice generated by a fourth account participating in the game, the second account and the fourth account being of a same faction during participation in the game; and
- a fourth playing unit, configured, during playing of the voice generated by the second account in the game, to play, in the user equipment to which the first account logs on, a voice generated by a fifth account participating in the game, the second account and the fifth account being of different factions during participation in the game.

A specific embodiment may refer to the example shown in the foregoing voice playing method, and will not be elaborated herein in this example.

Figure 16:
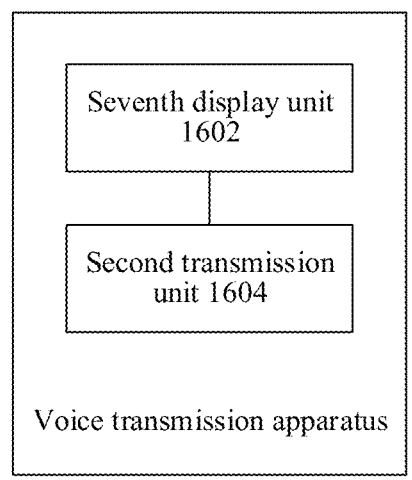
FIG. 16 is a schematic diagram of a voice transmission apparatus according to an embodiment of the present disclosure.

According to another aspect of the present disclosure, a voice transmission apparatus for implementing the voice transmission method is also provided. As shown in FIG. 16, the apparatus includes:
- a seventh display unit 1602, configured to display, in a case that a second account participates in a game, a game picture of the game and a voice acquisition object in user equipment to which the second account logs on, the voice acquisition object being used in an on state for allowing, in a case that setting information of a first account spectating in the game in the online game system indicates that listening to a voice of the second account is allowed, transmission of the voice generated by the second account to user equipment to which the first account spectating in the game logs on for playing; and
- a second transmission unit 1604, configured to transmit, in a case that the voice acquisition object is in the on state and the setting information of the first account in the online game system indicates that listening to the voice of the second account is allowed, the voice generated by the second account to the user equipment to which the first account logs on for playing.

A specific embodiment may refer to the example shown in the foregoing voice transmission method, and will not be elaborated herein in this example.

In some embodiments, the apparatus further includes:
- an eighth display unit, configured to display, in the user equipment to which the second account logs on at the beginning of displaying of the game picture of the game in which the second account participates, the voice acquisition object that defaults to the on state; or
- a third setting unit, configured to set the voice acquisition object in an acquisition state in response to a first target operation performed on the voice acquisition object in an off state.

A specific embodiment may refer to the example shown in the foregoing voice transmission method, and will not be elaborated herein in this example.

In some embodiments, the apparatus further includes:
- a fifth playing unit, configured to play, in the user equipment to which the second account logs on in a case that the voice acquisition object is in the on state and the setting information of the first account in the online game system indicates that transmission of the voice generated by the first account to the second account is allowed, the voice generated by the first account during spectating in the game; and
- a ninth display unit, configured to display a voice playing object in the user equipment to which the second account logs on in a case that the game picture of the game in which the second account participates is displayed, the voice playing object being used in the on state for allowing playing of the voice generated by the first account spectating in the game, and play, in the user equipment to which the second account logs on in a case that the voice playing object is in the on state and the setting information of the first account in the online game system indicates that transmission of the voice generated by the first account to the second account is allowed, the voice generated by the first account during spectating in the game.

A specific embodiment may refer to the example shown in the foregoing voice transmission method, and will not be elaborated herein in this example.

In some embodiments, the apparatus further includes:
- a tenth display unit, configured to display, in the user equipment to which the second account logs on at the beginning of displaying of the game picture of the game in which the second account participates, the voice playing object that defaults to the on state; or
- a fourth setting unit, configured to set the voice playing object in the on state in response to a second target operation performed on the voice playing object in an off state.

A specific embodiment may refer to the example shown in the foregoing voice transmission method, and will not be elaborated herein in this example.

In some embodiments, the fifth playing unit includes:
- a second playing module, configured to play, in the user equipment to which the second account logs on in a case that the first account is in association with the second account, the voice acquisition object is in the on state, and the setting information of the first account in the online game system indicates that transmission of the voice generated by the first account to the second account is allowed, the voice generated by the first account during spectating in the game.

A specific embodiment may refer to the example shown in the foregoing voice transmission method, and will not be elaborated herein in this example.

In some embodiments, the ninth display unit includes:
- a second display module, configured to display the voice playing object in the user equipment to which the second account logs on in a case that the first account is in association with the second account and the game picture of the game in which the second account participates is displayed.

A specific embodiment may refer to the example shown in the foregoing voice transmission method, and will not be elaborated herein in this example.

In some embodiments, the apparatus includes:
a second banning unit, configured to ban, in a case that the game picture of the game in which the second account participates is displayed, playing of a voice generated by the first account during spectating in the game.

A specific embodiment may refer to the example shown in the foregoing voice transmission method, and will not be elaborated herein in this example.

In some embodiments, at least one of the following is included:
a third transmission unit, configured, during transmission of the voice generated by the second account to the user equipment to which the first account logs on for playing, to transmit the voice generated by the second account to user equipment to which a third account spectating in the game logs on;
a fourth transmission unit, configured, during transmission of the voice generated by the second account to the user equipment to which the first account logs on for playing, to transmit the voice generated by the second account to user equipment to which a fourth account participating in the game logs on, the second account and the fourth account being of a same faction during participation in the game; and
a fifth transmission unit, configured, during transmission of the voice generated by the second account to the user equipment to which the first account logs on for playing, to transmit the voice generated by the second account to user equipment to which a fifth account participating in the game logs on, the second account and the fifth account being of different factions during participation in the game.

A specific embodiment may refer to the example shown in the foregoing voice transmission method, and will not be elaborated herein in this example.

Figure 17:
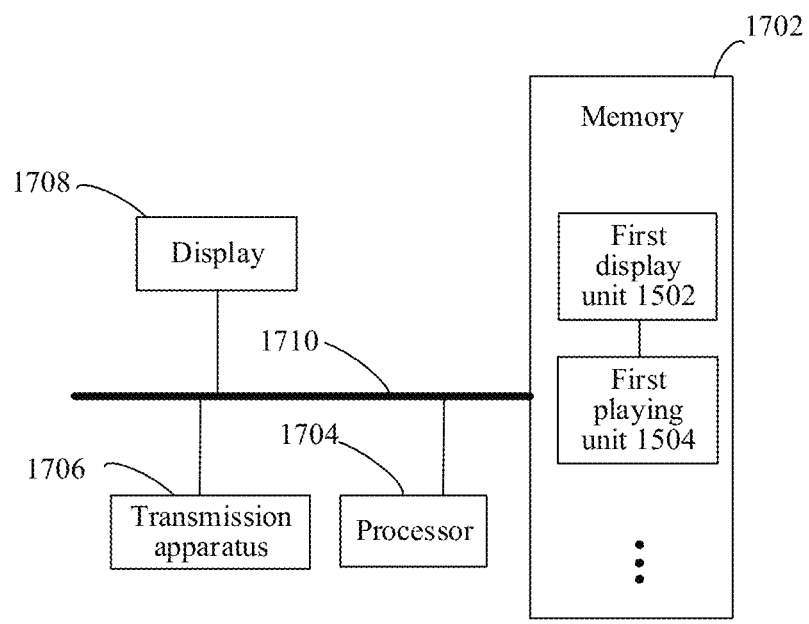
FIG. 17 is a schematic structural diagram of an electronic device according to an embodiment of the present disclosure.

According to still another aspect of the present disclosure, an electronic device for implementing the voice playing method and the voice transmission method is also provided. As shown in FIG. 17, the electronic device includes a memory 1702 and a processor 1704. The memory 1702 stores a computer program. The processor 1704 is configured to perform the operations in any one of the foregoing method embodiments by using the computer program.

In this embodiment, the electronic device may be in at least one of a plurality of network devices in a computer network.

In this embodiment, the processor may be configured to perform the following operations by using the computer program.

Display, in a case that a first account in an online game system selects to spectate in a game, a game picture of the game and a voice playing object in user equipment to which the first account logs on, the voice playing object being used in an on state for allowing the user equipment to which the first account logs on to play a voice generated by a second account participating in the game; and Play, in the user equipment to which the first account logs on in a case that the voice playing object is in the on state and setting information of the second account in the online game system indicates that the first account is allowed to listen to the voice of the second account, the voice generated by the second account in the game.

Alternatively:
Display, in a case that a second account in an online game system participates in a game, a game picture of the game and a voice acquisition object in user equipment to which the second account logs on, the voice acquisition object being used in an on state for allowing, in a case that setting information of a first account spectating in the game in the online game system indicates that listening to a voice of the second account is allowed, transmission of the voice generated by the second account to user equipment to which the first account spectating in the game logs on for playing; and Transmit, in a case that the voice acquisition object is in the on state and the setting information of the first account in the online game system indicates that listening to the voice of the second account is allowed, the voice generated by the second account to the user equipment to which the first account logs on for playing.

It may be understood by a person of ordinary skill in the art that a structure shown in FIG. 17 is merely schematic, and the electronic device may alternatively be a terminal device such as a smartphone (for example, an Android phone or an iOS phone), a tablet computer, a palm computer, a mobile internet device (MID), or a PAD. FIG. 17 does not limit the structure of the foregoing electronic device. For example, the electronic device may further include more or fewer components than those shown in FIG. 17, or has a different configuration from that shown in FIG. 17.

The memory 1702 may be configured to store a software program and a module, for example, a program instruction/module corresponding to a voice playing method, a voice transmission method, and various apparatuses disclosed elsewhere herein. The processor 1704 runs the software program and the module stored in the memory 1702, thereby executing various functional applications and data processing, namely implementing the voice playing method and the voice transmission method. The memory 1702 may include a high-speed random access memory (RAM), and may also include a nonvolatile memory, for example, one or more magnetic storage apparatuses, flash memories or other nonvolatile solid-state memories. In some examples, the memory 1702 may further include a memory arranged remotely relative to the processor 1704, and the remote memory may be connected to a terminal through a network. Examples of the network include but are not limited to the Internet, an intranet of an enterprise, a local area network, a mobile communication network, and a combination thereof. The memory 1702 may specifically but is not limited to be configured to store information such as the first account and the second account. In an example, as shown in FIG. 17, the memory 1702 may include but is not limited to the first display unit 1502 and the first playing unit 1504 in the voice playing apparatus, or the seventh display unit 1602 and the second transmission unit 1604 in the voice transmission apparatus not shown in FIG. 17. In addition, the electronic device may further include but is not limited to other module units in the voice playing apparatus, which will not be elaborated in this example.

A transmission apparatus 1706 is configured to receive or send data through a network. Specific examples of the network may include a wired network and a wireless network. In an example, the transmission apparatus 1706 includes a network interface controller (NIC), which may be connected with another network device and a router through a network cable, thereby communicating with the Internet or the local area network. In an example, the transmission apparatus 1706 is a radio frequency (RF) module, configured to communicate with the Internet in a wireless manner.

In addition, the electronic device further includes: a display 1708, configured to display information such as the first account and the second account; and a connection bus 1710, configured to connect each module component in the electronic device.

In another embodiment, the terminal device or the server may be a node in a distributed system. The distributed system may be a blockchain system. The blockchain system may be a distributed system including a plurality of nodes connected in a network communication form. The nodes may form a peer to peer (P2P for short) network. A computing device of any form, for example, an electronic device like a server or a terminal, may join the P2P network to become a node in the blockchain system.

According to an aspect of the disclosure, a computer program product or computer program is provided. The computer program product or computer program includes computer instructions. The computer instructions are stored in a computer-readable storage medium. A processor of a computer device reads the computer instructions from the computer-readable storage medium. The processor executes the computer instructions to enable the computer device to perform the voice playing method and the voice transmission method. The computer program is configured to run to perform the operations in any one of the foregoing method embodiments.

In this embodiment, the computer-readable storage medium may be configured to store a computer program for performing the following operations.

Display, in a case that a first account in an online game system selects to spectate in a game, a game picture of the game and a voice playing object in user equipment to which the first account logs on, the voice playing object being used in an on state for allowing playing of a voice generated by a second account participating in the game; and Play, in the user equipment to which the first account logs on in a case that the voice playing object is in the on state and setting information of the second account in the online game system indicates that the first account is allowed to listen to the voice of the second account, the voice generated by the second account in the game.

Alternatively:

Display, in a case that a second account in an online game system participates in a game, a game picture of the game and a voice acquisition object in user equipment to which the second account logs on, the voice acquisition object being used in an on state for allowing, in a case that setting information of a first account spectating in the game in the online game system indicates that listening to a voice of the second account is allowed, transmission of the voice generated by the second account to user equipment to which the first account spectating in the game logs on for playing; and Transmit, in a case that the voice acquisition object is in the on state and the setting information of the first account in the online game system indicates that listening to the voice of the second account is allowed, the voice generated by the second account to the user equipment to which the first account logs on for playing.

In this embodiment, it may be understood by a person of ordinary skill in the art that all or some operations in each method of the foregoing embodiments may be completed by a program instructing related hardware of the terminal device. The program may be stored in a computer-readable storage medium. The storage medium may include a flash drive, a read-only memory (ROM), a RAM, a magnetic disk, an optical disc, and the like.

The sequence numbers of the embodiments disclosed herein are only for description and do not represent superiority-inferiority of the embodiments.

When implemented in a form of a software function unit and sold or used as an independent product, the integrated unit in the foregoing embodiment may be stored in the computer-readable storage medium. Based on such an understanding, the technical solutions of the present disclosure substantially or parts making contributions to the related art or all or part of the technical solutions may be embodied in a form of a software product. The computer software product is stored in a storage medium, including a plurality of instructions for enabling one or more computer devices (which may be a personal computer, a server, a network device, or the like) to perform all or some operations of the method in each embodiment of the present disclosure.

Each of the foregoing embodiments of the present disclosure is described with different emphases, and undetailed parts in a specific embodiment may refer to related descriptions in the other embodiments.

In some embodiments provided in the disclosure, it is to be understood that the disclosed client may be implemented in another manner. The apparatus embodiments described above are merely schematic. For example, division of the units is only a logic function division, and other division methods can be used during practical implementation. For example, a plurality of units or components can be combined or integrated into another system, or some characteristics can be neglected or not executed. In addition, coupling or direct coupling or communication connection between displayed or discussed components may be indirect coupling or communication connection, implemented through some interfaces, of the units or the modules, and may be electrical or of other forms.

The units described as separate parts may be, but are not necessarily, physically separated or separable. The components displayed as units may be, but are not necessarily, physical units, that is, may be in the same place or distributed to a plurality of network units. Some or all of the units may be selected or omitted to achieve a particular objective of the solution of this embodiment.

In addition, each function unit in each embodiment of the present disclosure may be integrated into a processing unit. Alternatively, each unit may physically exist independently. Alternatively, two or more than two units may be integrated into a unit. The integrated unit may be implemented in a hardware form, or in a form of a software function unit.

The above is merely the preferred implementation of the present disclosure. A person of ordinary skill in the art may further make a plurality of improvements and embellishments without departing from the principle of the present disclosure, and these improvements and embellishments shall also fall within the protection scope of the present disclosure.

What is claimed is:

1. A voice playing method, applied to an electronic device and comprising:
displaying, based on a first account in an online game system selecting to spectate in a game, a game picture of the game and a voice playing object on a first user equipment to which the first account logs on, the voice playing object being for enabling the first user equipment to play a second voice generated in association with a second account participating in the game;
playing the second voice in the first user equipment based on the voice playing object being in an on state and based on setting information of the second account indicating that the first account is allowed to listen to the second voice of the second account; and during the displaying of the game image of the game, at least one of:
- playing, in the first user equipment, a third voice generated in association with a third account spectating in the game;
- playing, in the first user equipment, a fourth voice generated in association with a fourth account participating in the game, the second account and the fourth account being of a same faction during participation in the game; and
- playing, in the first user equipment, a fifth voice generated in association with a fifth account participating in the game, the second account and the fifth account being of different factions during participation in the game.

2. The method according to claim 1, further comprising at least one of:
- displaying the voice playing object in the first user equipment at the beginning of displaying of the game image, the voice playing object defaulting to the on state; or
- setting the voice playing object in the on state in response to a first target operation performed on the voice playing object in an off state.

3. The method according to claim 1, further comprising: displaying a voice acquisition object in the first user equipment, based on display of the game image of the game in which the first account spectates, the voice acquisition object being used in the on state for enabling transmission of the first voice generated in association with the first account during spectating in the game to the second user equipment to which the second account logs on for playing, and transmitting, based on the voice acquisition object being in the on state, the first voice to the second user equipment.

4. The method according to claim 3, further comprising at least one of:
- displaying, in the first user equipment, the voice acquisition object at the beginning of displaying of the game image of the game in which the first account spectates, the voice acquisition object defaulting to the on state; or
- setting the voice acquisition object in the on state in response to a second target operation performed on the voice acquisition object in an off state.

5. The method according to claim 3, further comprising, before the displaying of the game image of the game and of the voice playing object:
- displaying a plurality of associated spectator entries, each of the plurality of associated spectator entries being a spectator entry of a game in which one of a plurality of accounts is participating, each of the plurality of accounts being in association with the first account, the plurality of accounts comprising the second account; and
- obtaining a third target operation performed on a first associated spectator entry of the plurality of associated spectator entries, the first associated spectator entry being a spectator entry of the game in which the second account is participating, and the third target operation being used for indicating that the first account selects to spectate in the game in which the second account is participating.

6. The method according to claim 3, wherein the transmitting of the first voice comprises:
- transmitting, based on the first account being in association with the second account, on the voice playing object being in the on state, and on the setting information of the second account in the online game system indicating that listening to the first voice is allowed, the first voice to the second user equipment.

7. The method according to claim 3, wherein the displaying of the voice acquisition object comprises:
- displaying the voice acquisition object based on the first account being in association with the second account and on display of the game image of the game in which the first account spectates.

8. The method according to claim 1, further comprising:
- preventing transmission of a first voice generated in association with the first account during spectating in the game to a second user equipment to which the second account logs on for playing.

9. The method according to claim 8, further comprising, before the displaying of the game image of the game and of the voice playing object:
- displaying a plurality of recommended spectator entries, each of the plurality of recommended spectator entries being a spectator entry of a game in which one of a plurality of accounts selected and recommended from accounts playing games in the online game system is participating, the plurality of accounts comprising the second account; and
- obtaining a fourth target operation performed on a first recommended spectator entry of the plurality of recommended spectator entries, the first recommended spectator entry being a spectator entry of the game in which the second account is participating, and the fourth target operation being used for indicating that the first account selects to spectate in the game in which the second account is participating.

10. A voice transmission method, applied to an electronic device and comprising:
- displaying, based on a second account in an online game system participating in a game, a game picture of the game and a voice acquisition object on a second user equipment to which the second account logs on, the voice acquisition object being for enabling, based on setting information of a first account spectating in the game in the online game system indicating that listening to a second voice generated in association with the second account is allowed, transmission of the second voice to a first user equipment to which the first account logs on for playing;
- transmitting the second voice to the first user equipment, based on the voice acquisition object being in an on state and based on the setting information of the first account indicating that listening to the second voice is allowed; and
- during the displaying of the game image of the game, at least one of:
  - transmitting the second voice to third user equipment to which a third account spectating in the game logs on;
  - transmitting the second voice to fourth user equipment to which a fourth account participating in the game logs on, the second account and the fourth account being of a same faction during participation in the game; and
  - transmitting the second voice to fifth user equipment to which a fifth account participating in the game logs on, the second account and the fifth account being of different factions during participation in the game.

11. The method according to claim 10, further comprising at least one of:
displaying the voice acquisition object in the second user equipment at the beginning of displaying of the game image, the voice acquisition object defaulting to the on state; or
setting the voice acquisition object in the on state in response to a first target operation performed on the voice acquisition object in an off state.

12. The method according to claim 10, further comprising:
displaying a voice playing object in the second user equipment, based on display of the game image of the game in which the second account participates, the voice playing object being for enabling the second user equipment to play a first voice generated in association with the first account spectating in the game; and
playing, in the second user equipment, based on the voice playing object being in the on state and on the setting information of the first account in the online game system indicating that transmission of the first voice generated in association with the first account to the second account is allowed, the first voice.

13. The method according to claim 12, further comprising:
displaying, in the second user equipment, the voice playing object at the beginning of displaying of the game image of the game in which the second account participates, the voice playing object defaulting to the on state; or
setting the voice playing object in the on state in response to a second target operation performed on the voice playing object in an off state.

14. The method according to claim 10, further comprising:
playing, in the second user equipment, based on the first account being in association with the second account, on the voice acquisition object being in the on state, and on the setting information of the first account in the online game system indicating that transmission of a first voice generated in association with the first account to the second account is allowed, the first voice.

15. The method according to claim 12, wherein the displaying of the game image of the game and of the voice acquisition object comprises:

displaying the voice playing object in the second user equipment based on the first account being in association with the second account and on display of the game image of the game in which the second account participates.

16. The method according to claim 10, further comprising:
preventing playing of a first voice generated in association with the first account during spectating in the game.

17. A voice playing apparatus, comprising:
at least one memory configured to store program code; and
at least one processor configured to read the program code and operate as instructed by the program code, the program code comprising:
display code, configured to cause the at least one processor to display, based on a first account in an online game system selecting to spectate in a game, a game picture of the game and a voice playing object on a first user equipment to which the first account logs on, the voice playing object being for enabling the first user equipment to play a second voice generated in association with a second account participating in the game in the online game system; and
playing code, configured to cause the at least one processor to play the second voice in the first user equipment based on the voice playing object being in the an state and based on setting information of the second account indicating that the first account is allowed to listen to the second voice; and
the at least one processor is further configured to read the program code and operate as instructed by the program code to, during the displaying of the game image of the game, at least one of:
play, in the first user equipment, a third voice generated in association with a third account spectating in the game;
play, in the first user equipment, a fourth voice generated in association with a fourth account participating in the game, the second account and the fourth account being of a same faction during participation in the game; and
play, in the first user equipment, a fifth voice generated in association with a fifth account participating in the game, the second account and the fifth account being of different factions during participation in the game.

* * * * *